(12) United States Patent
Vashishtha et al.

(10) Patent No.: US 12,392,959 B2
(45) Date of Patent: Aug. 19, 2025

(54) OPTICAL WAVEGUIDE CONNECTING DEVICE

(71) Applicant: Arm Limited, Cambridge (GB)

(72) Inventors: Vinay Vashishtha, Chandler, AZ (US); Mudit Bhargava, Austin, TX (US); Brian Tracy Cline, Austin, TX (US); Saurabh Pijuskumar Sinha, San Antonio, TX (US); Gregory Munson Yeric, Austin, TX (US)

(73) Assignee: Arm Limited, Cambridge (GB)

( * ) Notice: Subject to any disclaimer, the term of this patent is extended or adjusted under 35 U.S.C. 154(b) by 721 days.

(21) Appl. No.: 17/288,498

(22) PCT Filed: Oct. 23, 2019

(86) PCT No.: PCT/GB2019/053021
§ 371 (c)(1),
(2) Date: Apr. 23, 2021

(87) PCT Pub. No.: WO2020/084306
PCT Pub. Date: Apr. 30, 2020

(65) Prior Publication Data
US 2021/0389520 A1    Dec. 16, 2021

Related U.S. Application Data

(63) Continuation of application No. 16/172,505, filed on Oct. 26, 2018, now Pat. No. 10,641,953.

(51) Int. Cl.
*G02B 6/12* (2006.01)
*G02B 6/26* (2006.01)
*G02B 6/42* (2006.01)

(52) U.S. Cl.
CPC ..... *G02B 6/12002* (2013.01); *G02B 6/12016* (2013.01); *G02B 6/262* (2013.01); *G02B 6/4226* (2013.01)

(58) Field of Classification Search
None
See application file for complete search history.

(56) References Cited

U.S. PATENT DOCUMENTS 6,907,173 B2   6/2005  Hiramatsu
7,229,203 B2   6/2007  Lath
(Continued)

FOREIGN PATENT DOCUMENTS

CN    1768433 A    5/2006
CN    102621630 A   8/2012
(Continued)

OTHER PUBLICATIONS

First Office Action, Issued Nov. 30, 2022, App. No. CN201980071994.7, 35 pages.
(Continued)

*Primary Examiner* — Roberts P Culbert
(74) *Attorney, Agent, or Firm* — Berkeley Law & Technology Group, LLP

(57) ABSTRACT

Disclosed are devices and techniques for facilitating transmission of light signals between optical waveguides formed on integrated circuit (IC) devices. In an implementation, one or more first waveguides may be formed in a structure such that at least a portion of the one or more first waveguides are exposed for optical connectivity. The structure may comprise first features to enable the structure to be interlocked with an IC device comprising second features complementary with the first features, so as to align at least a portion of the one or more first waveguides exposed to optically couple with one or more second waveguides formed in the first integrated circuit device.

12 Claims, 25 Drawing Sheets

(56) References Cited

U.S. PATENT DOCUMENTS

| | | | |
|---|---|---|---|
| 7,263,256 | B2 | 8/2007 | Kim et al. |
| 7,356,215 | B2* | 4/2008 | deBlanc ................ G02B 6/43 385/16 |
| 9,094,135 | B2 | 7/2015 | Pelley |
| 9,810,843 | B2* | 11/2017 | Stephens ............... G02B 6/131 |
| 10,641,953 | B1 | 5/2020 | Vashishtha et al. |
| 2002/0039464 | A1 | 4/2002 | Yoshimura et al. |
| 2003/0176002 | A1* | 9/2003 | Zhang ................... G02B 6/132 438/22 |
| 2004/0047539 | A1 | 3/2004 | Okubora et al. |
| 2004/0258359 | A1 | 12/2004 | Corkum et al. |
| 2015/0063755 | A1 | 3/2015 | Doany et al. |
| 2016/0349454 | A1* | 12/2016 | Zhang ..................... G02B 6/26 |
| 2017/0097470 | A1 | 4/2017 | Jiang |
| 2018/0017748 | A1 | 1/2018 | Mir Shafiei et al. |
| 2020/0132929 | A1 | 4/2020 | Vashishtha et al. |

FOREIGN PATENT DOCUMENTS

| | | |
|---|---|---|
| CN | 103620463 B | 10/2016 |
| WO | 2012003530 A1 | 1/2012 |

OTHER PUBLICATIONS

Response to First Office Action, Filed Apr. 11, 2023, App. No. CN201980071994.7, 22 pages.

Second Office Action, Issued Aug. 3, 2023, App. No. CN201980071994.7, 36 pages.

Response to Second Office Action, Filed Oct. 16, 2023, App. No. CN201980071994.7, 17 pages.

Qian, et al., "Compact 90 trench-based splitter for silicon-on-insulator rib waveguides", Optical Society of America, Dec. 10, 2007, vol. 15, No. 25, 7 pgs.

Farrell, Richard, "Spin-coating on nanoscale topography and phase separation of diblock copolymers" School of Mathematics, Statistics and Applied Mathematics, National University of Ireland, Galway, Apr. 11, 2008, 25 pgs.

Doany, et. al., "Terabit/s-Class Optical PCB Links Incorporating 360-GB/s Bidirectional 850 nm Parallel Optical Transceivers", Journal of Lightwave Technology, vol. 30, No. 4, Feb. 15, 2012, 12 pgs.

Nakamura, et al. "High-density Silicon Optical Interposer for Inter-chip Interconnects based on Compact and High Speed Components", CLEO:2013 Technical Digest 2 pgs.

Yang, et. al., "Interposer-to-Interposer Electrical and Silicon Photonic Interconnection Platform using Silicon Bridge", School of Electrical and Computer Engineering; Georgia Institute of Technology, Atlanta, Georgia, 2014, pp. 71-72.

Taira, et, al., "Improved Connectorization of Compliant Polymer Waveguide Ribbon for Silicon Nanophotonics Chip Interfacing to Optical Fibers", 2015 Electronic Components & Technology Conference, 6 pgs.

J. Webster, "Silicon Photonics", Wiley Encyclopedia of Electrical and Electronics Engineering. Copyright#2015 John Wiley & Sons, Inc., DOI: 10.1002/047134608X.W8287, 2015, 22 pgs.

Boyer, et. al., "Sub-Micron Bondline-Shape Control in Automated Assembly of Photonic Devices", 2016 IEEE 66th Electronic Components and Technology Conference, 7 pgs.

Zia, et. al., "Chip-to-chip interconnect integration technologies", IEICE Electronics Express, vol. 13, No. 6, published Mar. 25, 2016, 16 pgs.

Bernabe, "On-Board Silicon Photonics-Based Transceivers With 1-Tb/s Capacity", IEEE Transactions On Components, Packaging and Manufacturing Technology, vol. 6, No. 7, Jul. 2016, 8pgs.

Barwicz, et. al., "High-Throughput Photonic Packaging", IBM High-Throughput Photonic Packaging, Mar. 2017, 27 pgs.

Brunschwiler, et. al., "Scalable Packaging Platform Supporting High-Performance 3D Chip Stacks", IIBM Research—Zurich, RUschlikon, Switzerland, 2Power Electronic Systems Laboratory (PES), ETH Zurich, Zurich, Switzerland, Feb. 2017, 7 pgs.

Barwicz, et. al., "Low-Cost Interfacing of Fibers to Nanophotonic Waveguides: Design for Fabrication and Assembly Tolerances", vol. 6, No. 4, Aug. 2014, 19 pgs.

Carroll, et. al., "Photonic Packaging: Transforming Silicon Photonic Integrated Circuits into Photonic Devices", Applied Sciences, Received: Nov. 7, 2016; Accepted: Dec. 5, 2016; Published: Dec. 15, 2016, 21 pgs.

Restriction Requirement, U.S. Appl. No. 16/172,505, Mailed Jun. 27, 2019, 9 Pages.

Response to Restriction Requirement, U.S. Appl. No. 16/172,505, filed Aug. 27, 2019, 14 Pages.

Office Action, U.S. Appl. No. 16/172,505, Mailed Sep. 6, 2019, 14 Pages.

Response to Office Action, U.S. Appl. No. 16/172,505, filed Dec. 6, 2019, 23 Pages.

Notice of Allowance, U.S. Appl. No. 16/172,505, Mailed Dec. 26, 2019, 13 Pages.

Issue Fee, U.S. Appl. No. 16/172,505, filed Mar. 23, 2020, 15 Pages.

Notification of Transmittal of the International Search Report and the Written Opinion of the International Searching Authority, or the Declaration, App. No. PCT/GB2019/053021, Filed Oct. 23, 2019, Mailed Jan. 20, 2020, 1 Page.

International Search Report, App. No. PCT/GB2019/053021, Filed Oct. 23, 2019, Mailed Jan. 20, 2020, 6 Pages.

Written Opinion of the International Searching Authority, App. No. PCT/GB2019/053021, Filed Oct. 23, 2019, Mailed Jan. 20, 2020, 12 Pages.

Notification Concerning Transmittal of International Preliminary Report on Patentability, App. No. PCT/GB2019/053021, Mailed May 6, 2021, 1 Page.

International Preliminary Report on Patentability, App. No. PCT/GB2019/053021, Mailed May 6, 2021, 1 Page.

Written Opinion of the Searching Authority, App. No. PCT/GB2019/053021, Mailed May 6, 2021, 10 Pages.

Third Office Action, App No. CN201980071994.7, Dated Feb. 3, 2024, 6 pages.

Translation of Third Office Action, App No. CN201980071994.7, Dated Feb. 3, 2024, 11 pages.

Response to Third Office Action, App No. CN201980071994.7, Filed Mar. 20, 2024, 27 pages.

Fourth Office Action, App No. CN201980071994.7, Dated Apr. 3, 2024, 6 pages.

Translation of Fourth Office Action, App No. CN201980071994.7, Dated Apr. 3, 2024, 13 pages.

Response to Fourth Office Action, App No. CN201980071994.7, Dated May 31, 2024, 27 pages.

Proposed Claims for Response to Telephone Notification, App No. CN201980071994.7, Dated Jun. 6, 2024, 8 pages.

Notice of Registration, App. No. CN201980071994.7, Mailed Jun. 19, 2024, 5 pages.

* cited by examiner

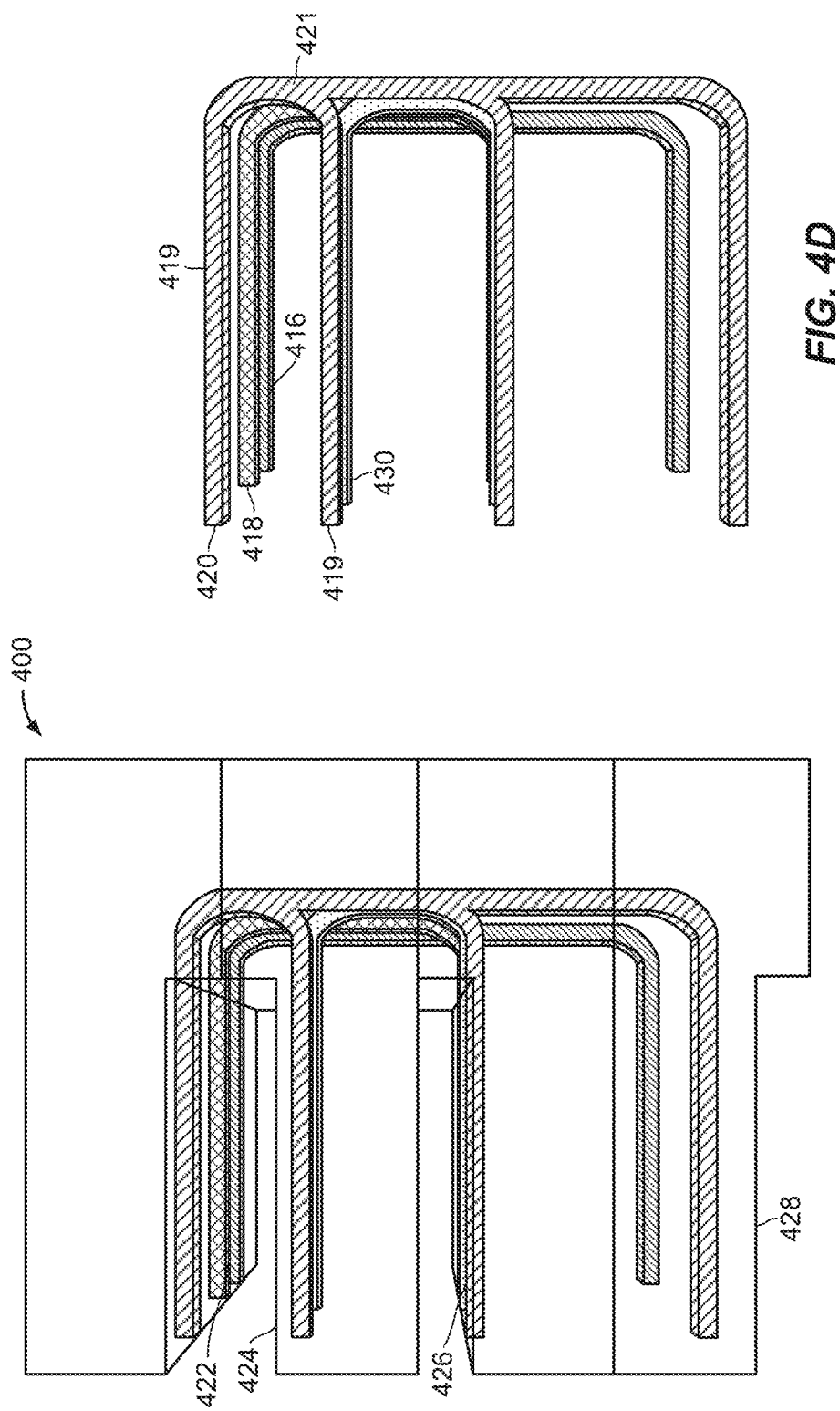

OPTICAL WAVEGUIDE CONNECTING DEVICE

This application is a 371 National Phase application of PCT/GB2019/053021 entitled "OPTICAL WAVEGUIDE CONNECTING DEVICE," filed Oct. 23, 2019 which claims the benefit of priority to U.S. patent application Ser. No. 16/172,505 entitled "OPTICAL WAVEGUIDE CONNECTING DEVICE" filed Oct. 26, 2018, which are incorporated herein by reference in their entirety.

Subject matter disclosed herein relates to systems, devices, and/or processes for transmitting light signals between device.

Integrated circuit devices, such as processors, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may include integrated circuit devices, such as processors, to process signals and/or states representative of a diverse of content types for a variety of purposes.

Electrical interconnects have enabled inter-chip communication between integrated circuit components and intra-chip communication between components within an integrated circuit. As evolution in semiconductor processing technology has produced integrated circuits capable of processing at increasing speeds, the performance growth of electrical interconnects lags behind the compute capacity. Consequently, electrical interconnects have become a limiting factor in overall growth in system performance. A limit imposed by electrical interconnects is further exacerbated by increased metal wire resistivity at smaller metal geometries employed in advanced complementary metal oxide semiconductor (CMOS) process nodes.

To address limits of communication imposed by electrical interconnects, light signals may be used in lieu of electrical signals to facilitate inter-chip and intra-chip communication. For example, light signals may enable lower latency, lower transmission power loss and higher bandwidth for carrying information.

In one example implementation, photonics may employ light for signal processing and transmission in intra-chip and inter-chip communication. Waveguides, which can also be referred to as 'photonic waveguides', and fibre optics cables—hereinafter referred to as 'fibre'—may be employed in some implementations as the optical equivalent of metal wires used in electrical interconnects. In one example, waveguides having a small size (e.g., 200 nm to 3 µm) may be implemented for on-chip applications. Waveguides may, for example, reside on a substrate, such as bulk silicon or silicon-on-insulator (SOI). Fibres may then be used for off-chip applications due to their flexibility and ease of manufacturing, owing to their large size (1 µm to 10 µm).

Briefly, particular implementations are directed to a device comprising: a solid structure; one or more first waveguides formed in the solid structure, at least a first portion of the one or more first waveguides being exposed on a first surface of the structure for optical connectivity, wherein the solid structure comprises first features to enable the solid structure to be interlocked with a first integrated circuit device, the first integrated comprising second features complementary with the first features, so as to align the exposed first portion of the one or more first waveguides to optically couple with one or more second waveguides formed in the first integrated circuit device.

Another particular implementation is directed to a device comprising: a structure comprising at least a first planer surface to mate with a first integrated circuit device and a second planer surface to mate with a second integrated circuit device, the first and second planer surfaces being substantially parallel to one another; and one or more first wave guides having a first portion exposed on the first planer surface, a second portion exposed on the second planer portion and a third portion connecting the first and second portions to route optical signals between the first and second planer surfaces.

Another particular implementation is directed to a method comprising: forming at least a first two-dimensional waveguide in a solid structure; and forming at least a second two-dimensional waveguide in the solid structure, wherein the first two-dimensional waveguide and the second two-dimensional waveguide collectively span three dimensions within the solid structure.

It should be understood that the aforementioned implementations are merely example implementations, and that claimed subject matter is not necessarily limited to any particular aspect of these example implementations.

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 4A through 4D are diagrams depicting features of a connector device comprising optical waveguides to facilitate communication between integrated circuit devices according to an embodiment;

Figure 1A:
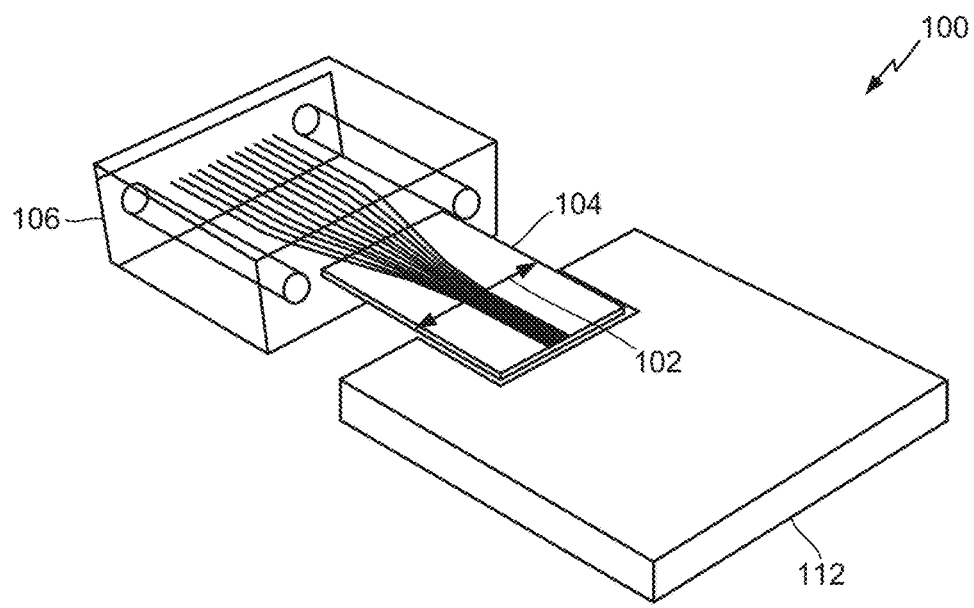
FIG. 1A is a schematic diagram of an optical connector in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As pointed out above, one method for connecting two or more disparate integrated circuits (ICs) optically is through the use of fibre optic cables. This may be implemented, for example, by optical coupling between waveguides residing on ICs using fibre optical cables. These fibres optic cables may then transmit modulated light signals between waveguides on the ICs. In particular implementations, however, a difference in size between larger fibre optic cables and on-chip waveguides may introduce a mismatch of light mode size. Converting between light mode sizes, or mode field diameters (MFDs), may introduce energy loss, mitigating which requires the use of couplers.

One method of accomplishing the aforementioned waveguide-to-fibre optical coupling may involve tapering-down a waveguide on an IC, which may force a light mode out to be coupled to a spot-size converter (SSC), also known as mode converter (MC) —essentially a larger waveguide. A size of a light mode coupled to a larger waveguide may thus increase. Light from this larger waveguide may then pass on to a lensed fibre cable. Another method for coupling waveguide to fibre may involve employing grating couplers. A size of grating couplers may be nearly equal to a fibre cable's mode field diameter. Grating couplers comprise sub-micron periodic trenches etched into the substrate, for example, SOI. Light incident on these trenches may undergo coherent interference and diffractively couple a fibre cable to a waveguide.

A waveguide-to-fibre cable coupling may be complicated by the difficulty associated with aligning a fibre cable array to waveguides due to their vastly different physical sizes. Any misalignment between a waveguide and fibre cable coupled to one another may result in energy loss, which in certain cases can be large enough so as to cause the system to exceed the acceptable energy dissipation limit. To enable efficient coupling, an active alignment technique may be employed. This may entail monitoring optical power during a process of alignment. However, monitoring techniques may result in production latency, passive alignment techniques may entail robust manufacturing procedures which are difficult and expensive to implement.

Figure 1B:
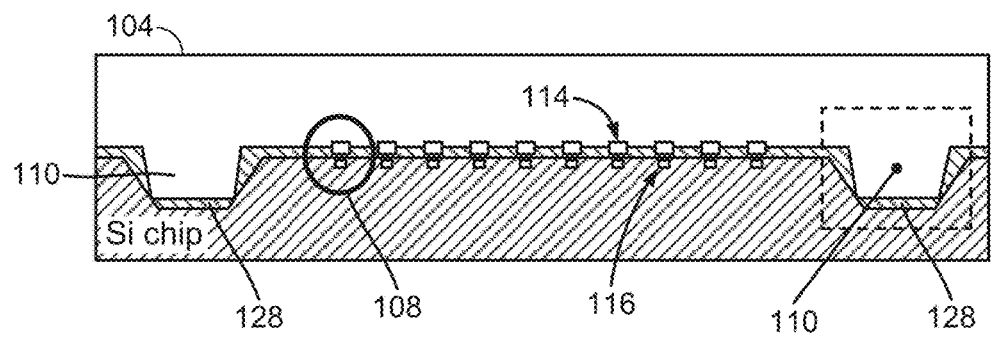
FIG. 1B shows a cross-section of an optical connection to an integrated circuit device according to an embodiment.

To address these issues, a device such as interface 100 shown in FIG. 1A, includes an integrated circuit (IC) chip 112 and connector 106 coupled together by polymer ribbon 104. Here, connector 106 and polymer ribbon 104 may facilitate transmission of optical signals between waveguides (not shown) formed on IC chip 112 and waveguides formed on a second IC chip (not shown) through the optical fibre array (not shown) attached to the connector 106. As shown in FIG. 1B, polymer ribbon 104 may comprise optical waveguides 114 formed on a surface facing IC chip 112. Optical waveguides 114 may be formed to optically couple with waveguides 116 formed, using suitable materials such as silicon or silicon nitride for core and silica for cladding, on IC chip 112. The materials that may be used for waveguide formation are not limited to the aforementioned materials, and a multitude of other materials, such as InP, GaAs, and polymer materials, may also be used for waveguide formation. According to an embodiment, interface 100 may enable passive alignment assembly with low energy loss. In one particular implementation, one side of the structure contains polymer cores (2.345 μm×2.345 μm) constituting an array that complies with the 12×1 mechanical transfer (MT) fibre interface standard—but other standards can be used. Part of the structure is encapsulated in a ferrule. Polymer cores formed on polymer ribbon 104 may be at a 250 μm pitch and transition into waveguides 114 that are at about a 50 μm pitch. Optical waveguides 114 may optically couple with counterpart optical waveguides 116 formed on IC 112. Optical waveguides 116 may comprise an inverse taper to enable light mode protrusion facilitating optical coupling with wider optical waveguides—serving as SSCs—over a common parallel run length. FIG. 1B shows notches 128 formed in IC chip 112 to receive protrusions 110 formed on polymer ribbon 104 for assisting with self-alignment during assembly. In an implementation, IC chip 112 and polymer ribbon 104 may have features to assist self-alignment (e.g., enabling ±1-2 μm alignment despite of ±10 μm placement accuracy).

Unfortunately, interface 100 may experience power losses at various points. For example, losses may be introduced at a connection to a fiber array (not shown) at point 124, in a transition to a routing cross section and transition to waveguide on the IC at point 126. For system comprising of several stacked IC chips, such as in 3D IC, or connected over a parent substrate, using interposers, for example, the use of electrical interconnects for inter-IC connections may be prohibitive in certain scenarios due to the large connection lengths that can result in these interconnects to not meet the performance specifications, for instance, energy, bandwidth, or latency, etc.

As described below, particular embodiments described herein are directed to one or more first waveguides formed on a first surface of a solid structure, the one or more first waveguides being exposed for optical connectivity. The solid structure further comprises first features to enable the solid structure to be interlocked with a first integrated circuit device, where the first integrated circuit comprises second features complementary with the first features, so as to align first portions of the one or more first waveguides exposed on the first surface to optically couple with one or more second waveguides formed in the first integrated circuit device. Particular embodiments may enable a reduction in transmission losses and use of more energy efficient stacked IC chips, such as 3D IC chips, with enhanced bandwidth or reduced inter-chip communication latencies.

Figure 2A:
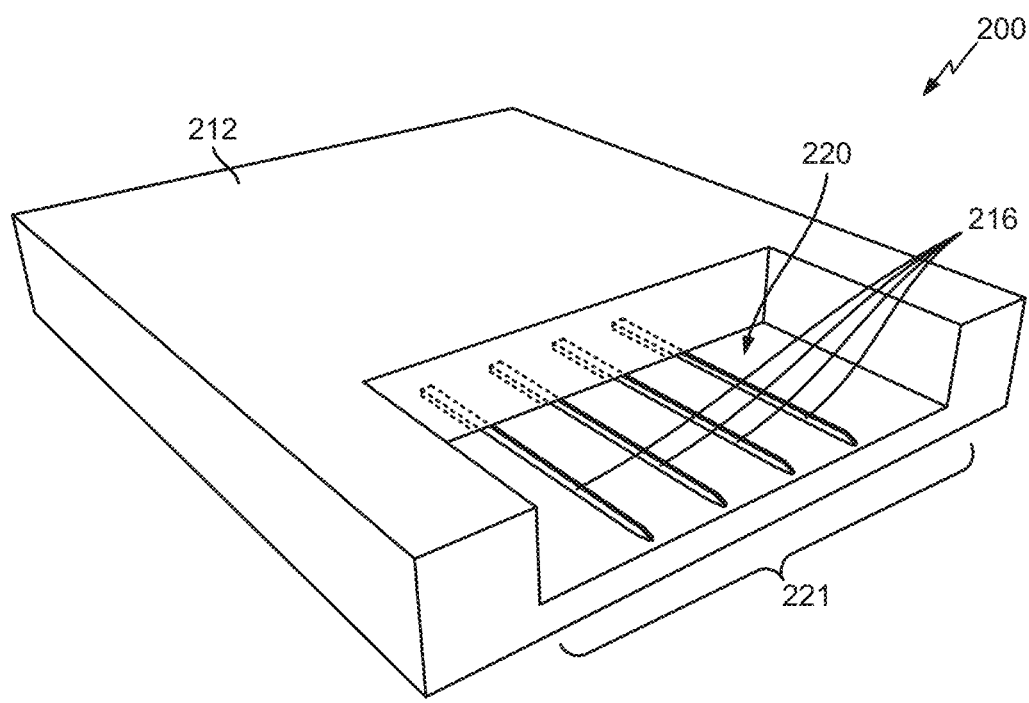
FIG. 2A is a diagram depicting features in a first view of an integrated circuit device having exposed optical waveguides according to an embodiment.
Figure 2B:
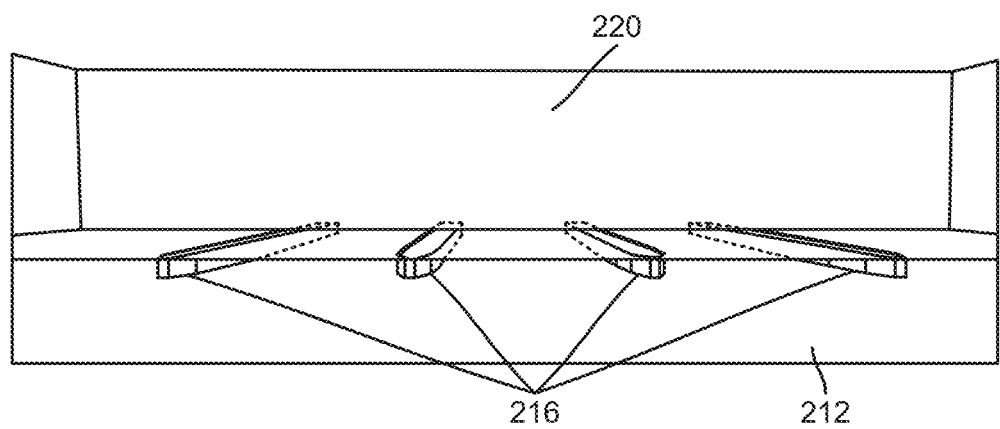
FIG. 2B is a diagram depicting features in a second view of an integrated circuit device having exposed optical waveguides according to an embodiment.

FIGS. 2A and 2B are diagrams depicting features in views of an integrated circuit device 200 having exposed optical waveguides 216 according to an embodiment. IC device 200 comprises a cavity or channel 220 formed in a substrate 212 having dimensions matching dimensions of a structure comprising waveguides formed therein (not shown) that permits IC device 200 to fixedly interlock with the structure, and communicate with another IC device (not shown). On a surface of cavity or channel 220 are formed optical waveguides 216. According to an embodiment, optical waveguides 216 are positioned and exposed in the surface of cavity or channel 220 to enable an optical coupling with other waveguides formed in the structure to interlock with IC device 200.

In this context, two separately manufactured articles are "interlocked" or "fixedly interlocked" if the two devices are physically coupled together such that there is minimal movement of the two articles relative to one another. In an example implementation, and as described below, two separately manufactured articles may have complementary physical features enabling the two articles interlocked by application of force pressing the two articles together.

In this context, different waveguides are "optically coupled" if a proximity of the different waveguides and a relative orientation of the waveguides are sufficient to enable reliable transmission of a light signal between the different waveguides. For example, proximate first and second waveguides may be optically coupled if a light signal radiating from an exposed surface of the first waveguide may sufficiently energize the second waveguide such that the light signal may be detected by a circuit attached to the second waveguide.

Figure 3A:
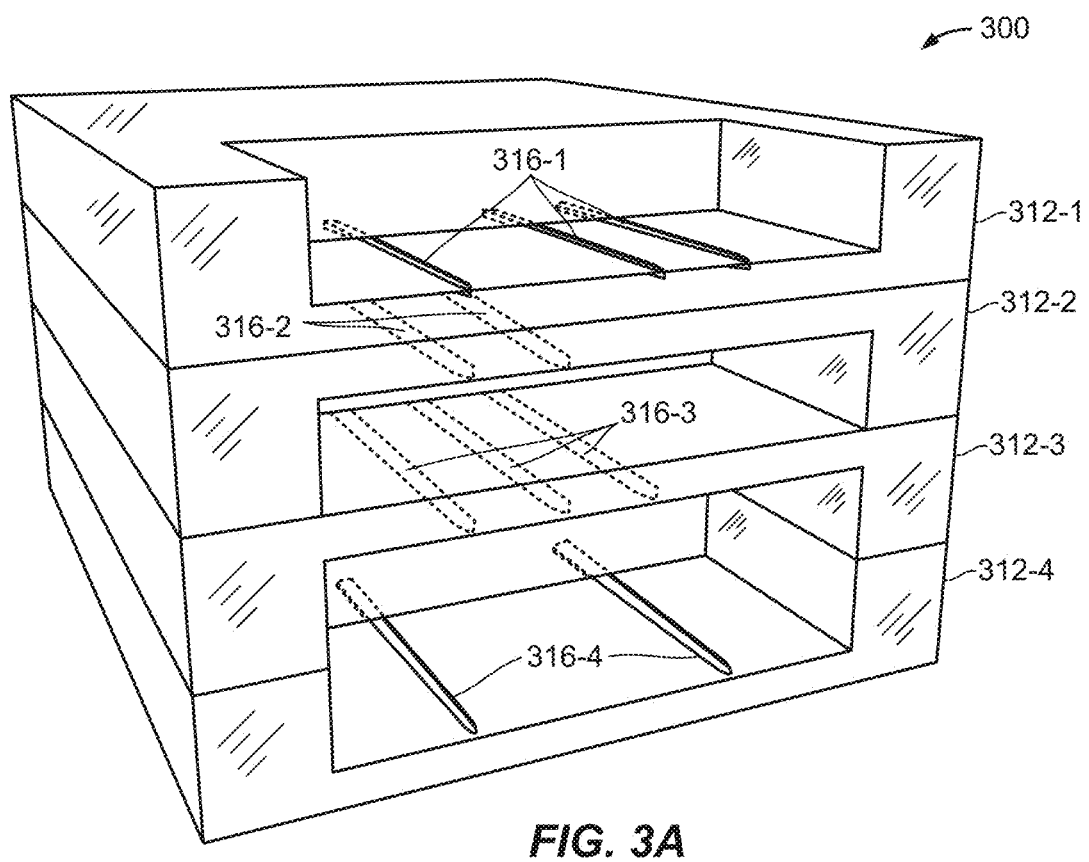
FIG. 3A is a diagram depicting features of vertically stacked integrated circuit devices having exposed optical waveguides according to an embodiment.
Figure 3B:
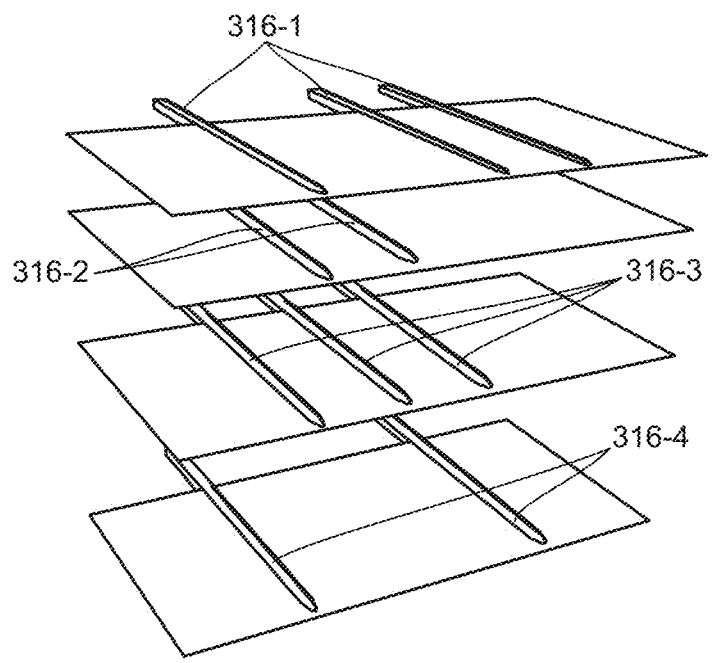
FIG. 3B is a diagram depicting exposed optical waveguides formed on the vertically stacked integrated circuit devices of FIG. 3A according to an embodiment.
Figure 4A:
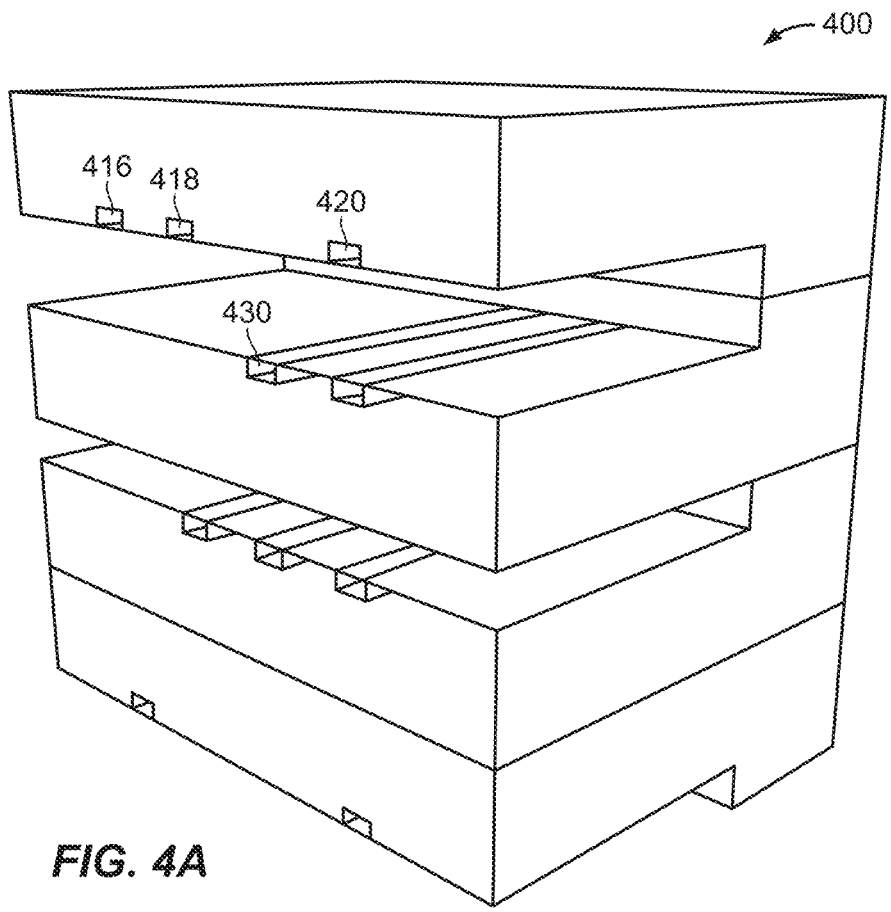
Figure 4B:
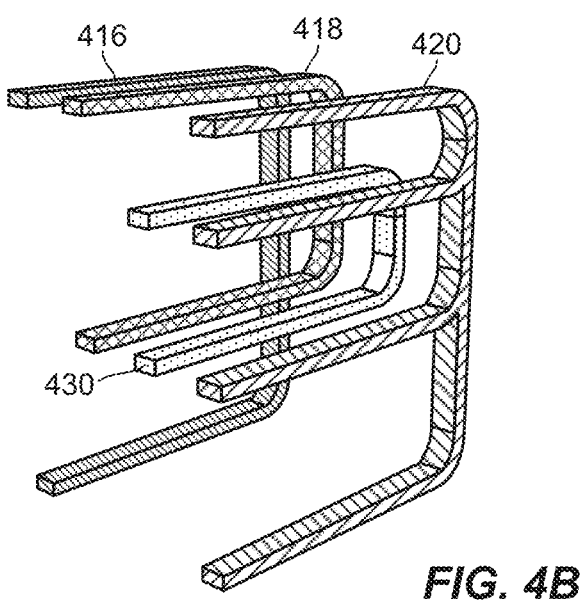

FIGS. 3A and 3B are diagrams depicting features of a structure 300 comprising vertically stacked IC devices 312. In a particular implementation, IC devices 312-1, 312-2, 312-3 and 312-4 may be separately fabricated (e.g., using processes similar to processes to form IC device 200 discussed above) as different units, and bonded to a vertical structure using any one of several techniques to bond vertically stacked integrated circuit devices.

As shown, IC devices 312 comprise exposed optical waveguides 316 formed on surfaces of cavities or channels having features to interlock with a different structure (not shown) comprising optical waveguides to route optical signals between IC devices (e.g., between two IC devices 312 or between one IC device 312 and another IC device not in the vertical stack structure 300). In a particular implementation, an IC device 312 may comprise optical waveguides 316 formed on surfaces of cavities or channels as described above with reference to FIGS. 2A and 2B. Also, an IC device 312 may comprise circuits and components to perform processes or functions to facilitate transmission of optical signals through optical waveguides 316 and the processing of optical signals received and detected on optical waveguides 316. As such, and as discussed above in connection with IC device 200, IC devices 312 may comprise devices coupled to optical waveguides 316 to facilitate transmission of optical signals, such as laser driver circuitry (where the laser may either be directly or indirectly modulated), to facilitate modulation of optical signals, such as micro-ring resonator modulators, and to facilitate detection of received optical signals, such as photodetectors and transimpedance amplifiers. For example, laser driver circuitry, which may be responsive to an electrical signal from a component formed in an IC device, may either simply generate or both generate and modulate a light signal in an attached or coupled waveguide. Furthermore, a modulator circuitry, which may be responsive to an electrical signal from a component formed in an IC device, may modulate a light signal in an attached or coupled waveguide device. Also, a photodetector in combination with a transimpedance amplifier may generate an electrical signal in an IC device responsive to light energy emitted from a waveguide to the photodetector.

Figure 5A:
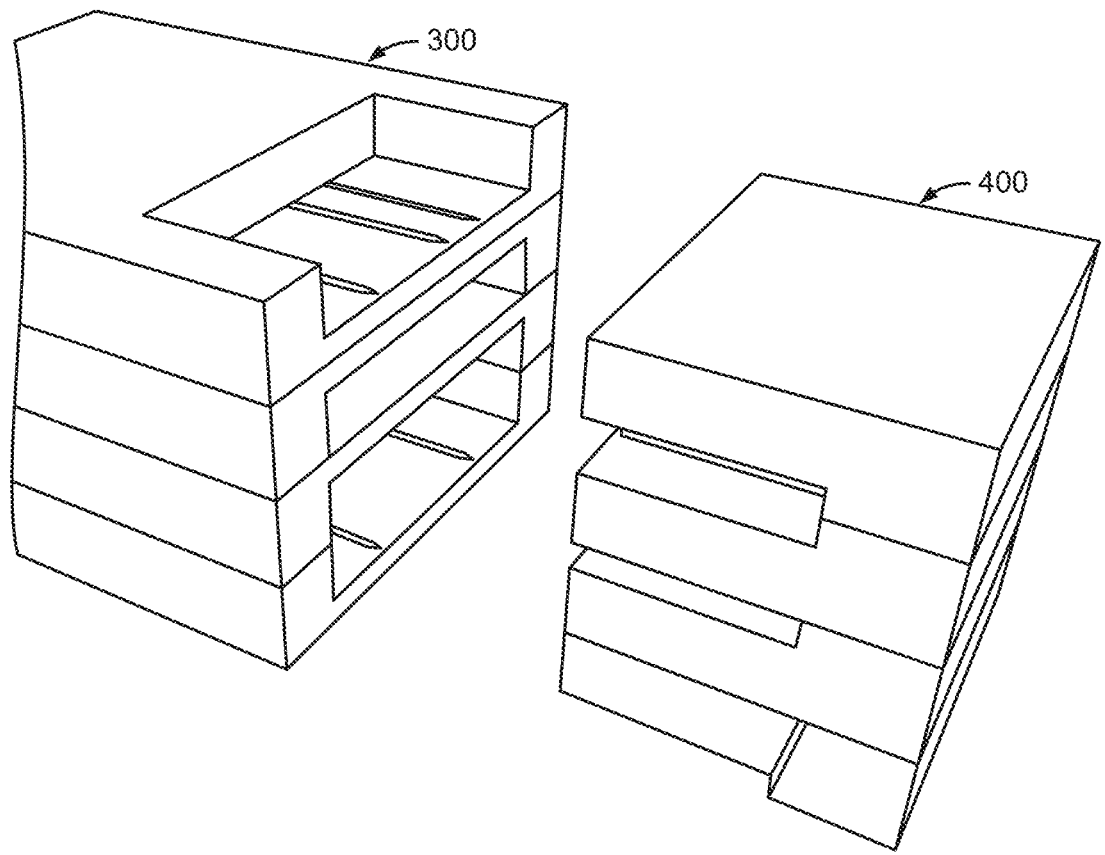
FIGS. 5A and 6A are diagrams illustrating side-by-side views of an optical connector device with stacked integrated circuit devices according to an embodiment.
Figure 5B:
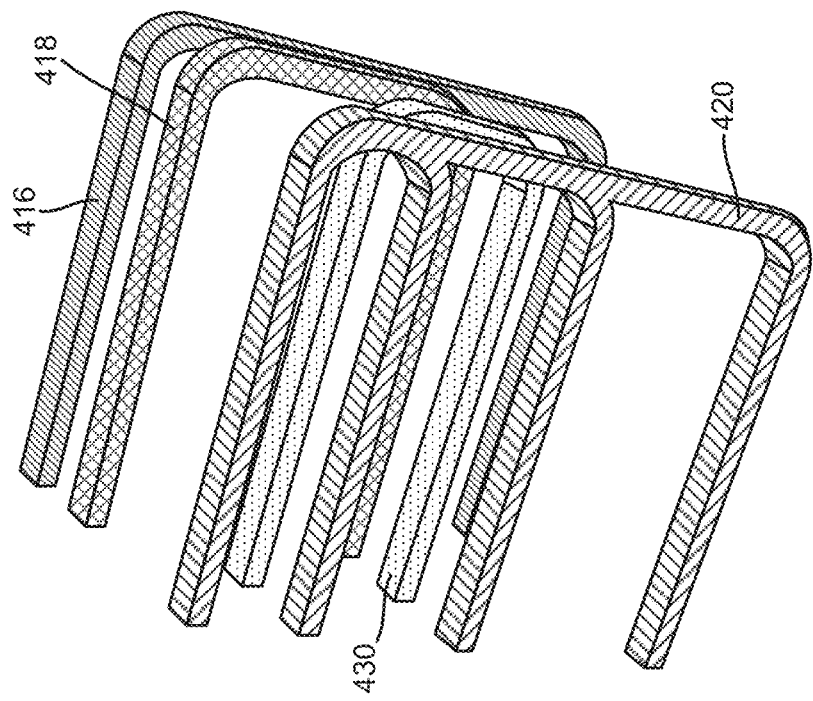
FIGS. 5B and 6B are diagrams illustrating features of waveguides formed on integrated circuits and optical connecting devices according to an embodiment.
Figure 5B:
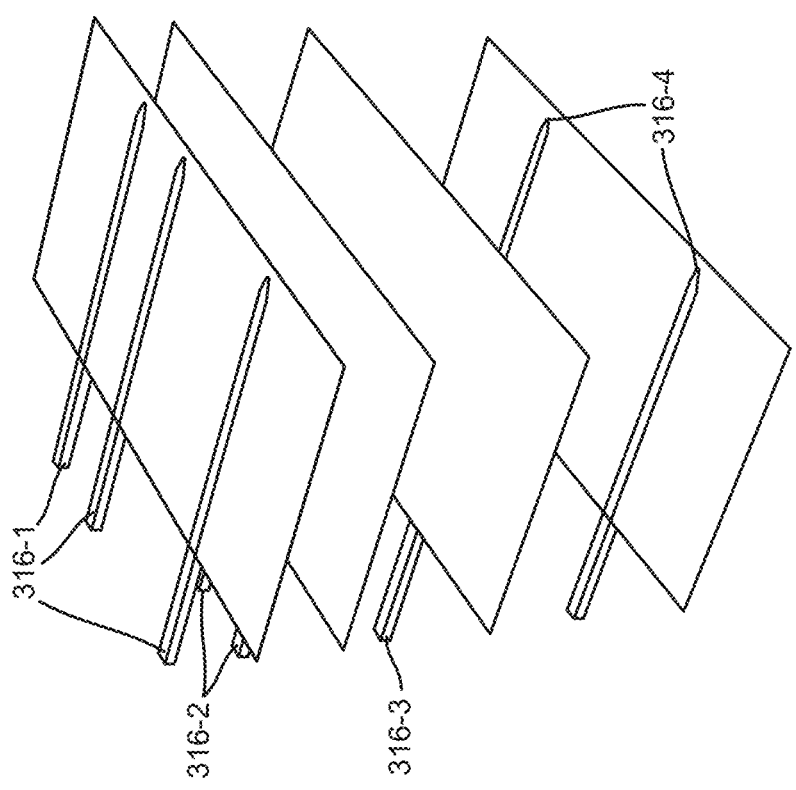

FIG. 3B shows surfaces of cavities or channels of IC devices 312 on which exposed portions of optical waveguides 316 are formed. As shown in FIGS. 5A and 5B, according to an embodiment, optical waveguides 316 may be positioned so as to optically couple with optical waveguides 416, 418, 420 and 430 formed on surfaces of structure 400 shown in FIGS. 4A through 4D. Interlocking between structures 300 and 400 may enable optical coupling of optical waveguides formed on structure 300 and structure 400, but is not shown in the aforementioned figures shown herein for easily distinguishing the waveguides. In particular implementations, optical waveguides 416, 418, 420 and 430 may be formed by deposition of a suitable waveguide material, such as silicon, silicon nitride, or polymer, etc., using techniques discussed herein. In one particular implementation, such a waveguide material may comprise a commercially available waveguide material such as silicone-based polymer waveguide core material WG-1010 by Dow Corning Corporation.

According to an embodiment, structure 400 may comprise features matching cavities or channels formed in IC devices 312-1, 312-2, 312-3 and 312-4 such that structure 400 may fixedly interlock with structure 300. For example, portions of structure 400 exposing portions of optical waveguides 416, 418, 420 and 430 may comprise dimensions or features enabling a fitted insertion of these portions of structure 400 into matching dimensions or features of cavities or channels formed in IC devices 312-1, 312-2, 312-3 and 312-4. Here, structure 400 may remain fixedly interlocked with structure 300 to form a single unit to be integrated with a larger system.

According to an embodiment, structure 400 may be formed from a material having 1) sufficient rigidity to provide structural support to optical waveguides 416, 418, 420 and 430 and 2) suitability as a cladding material to surround waveguides 416, 418, 420 and 430. Material of structure 400 may also allow some deformation to shape structure 400 to features of IC devices 312-1, 312-2, 312-3 and 312-4, allowing structure 400 to fixedly interlock with structure 300 from being pressed together. Such a material may comprise a commercially available polymer cladding material such as, for example, silicone-based polymer OE-4141 or WG-1017 available from Dow Corning Corporation.

In one implementation, such a fitted insertion may comprise pressing together structures 300 and 400 as shown in FIG. 5A by applying minimal force to overcome friction between portions of structure 300 contacting portions of structure 400 during insertion. Structures 300 and 400 may be held together to remain interlocked by surface tension between portions of structure 300 contacting portions of structure 400 and/or an adhesive applied between portions of structure 300 contacting portions of structure 400.

In a particular implementation, while structures 300 and 400 are fixedly interlocked, portions of optical waveguides 316 may align with and optically couple to portions of optical waveguides 416, 418, 420 and 430. By aligning portions of optical waveguides 416, 418, 420 and 430 to optically couple with optical waveguides 316, structure 400 may route optical signals between different IC devices 312 in structure 300. For example, optical waveguide 420 may reliably route light signals between or among optical waveguides 316-1, 316-2, 316-3 and 316-4 formed on IC devices 312-1, 312-2, 312-3 and 312-4. Similarly, optical waveguide 430 may route optical signals between optical waveguides 316-2 and 316-3 formed on IC devices 312-2 and 312-3. Likewise, optical waveguide 418 may route optical signals between optical waveguides 316-1 and 316-3 formed on IC devices 312-1 and 312-3. Also, optical waveguide 418 may route optical signals between optical waveguides 316-1 and 316-3 formed on IC devices 312-1 and 312-3.

Figure 1C:
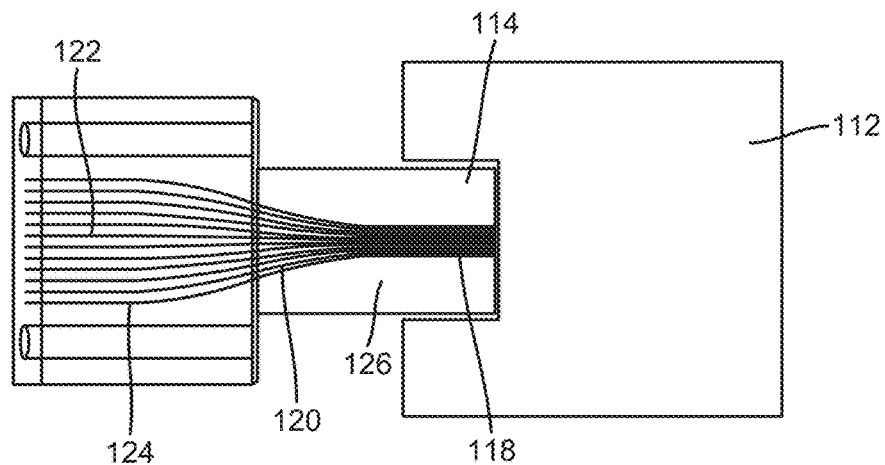
FIG. 1C shows a top view of an optical connection to an integrated circuit device according to an embodiment.

By having contiguous optical waveguides that optically couple with exposed waveguides formed on IC devices, structure 400 may reduce or eliminate losses that are inherent to optical coupling methods that rely on waveguide-to-fibre coupling, such as in the case of the aforementioned embodiment illustrated in FIGS. 1A through 1C. Forming structure 400 to fixedly interlock with structure 300 may simplify alignment of waveguides in structure 400 with exposed portions of optical waveguides 316-1, 316-2, 316-3 and 316-4.

Figure 6A:
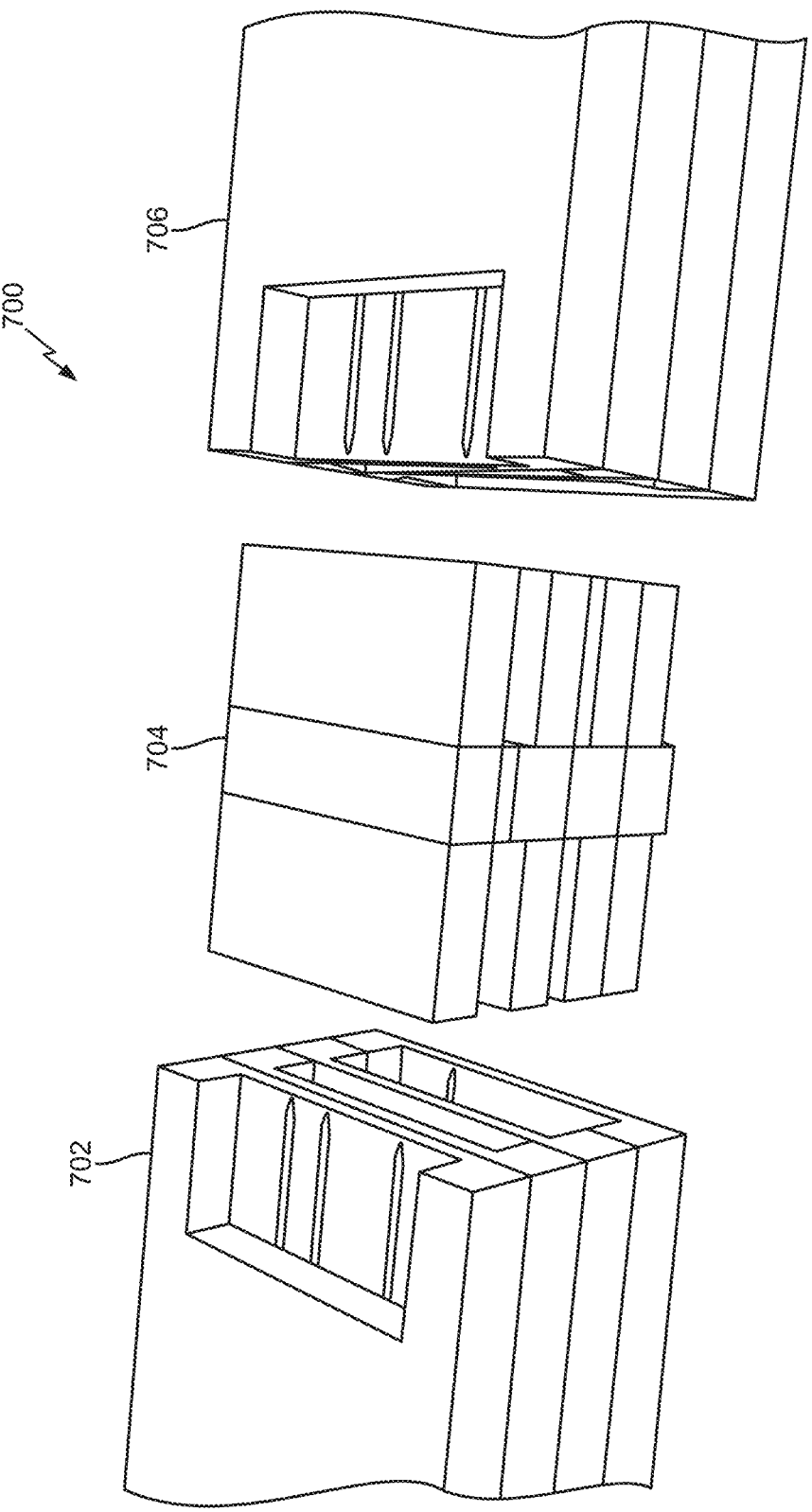
Figure 6B:
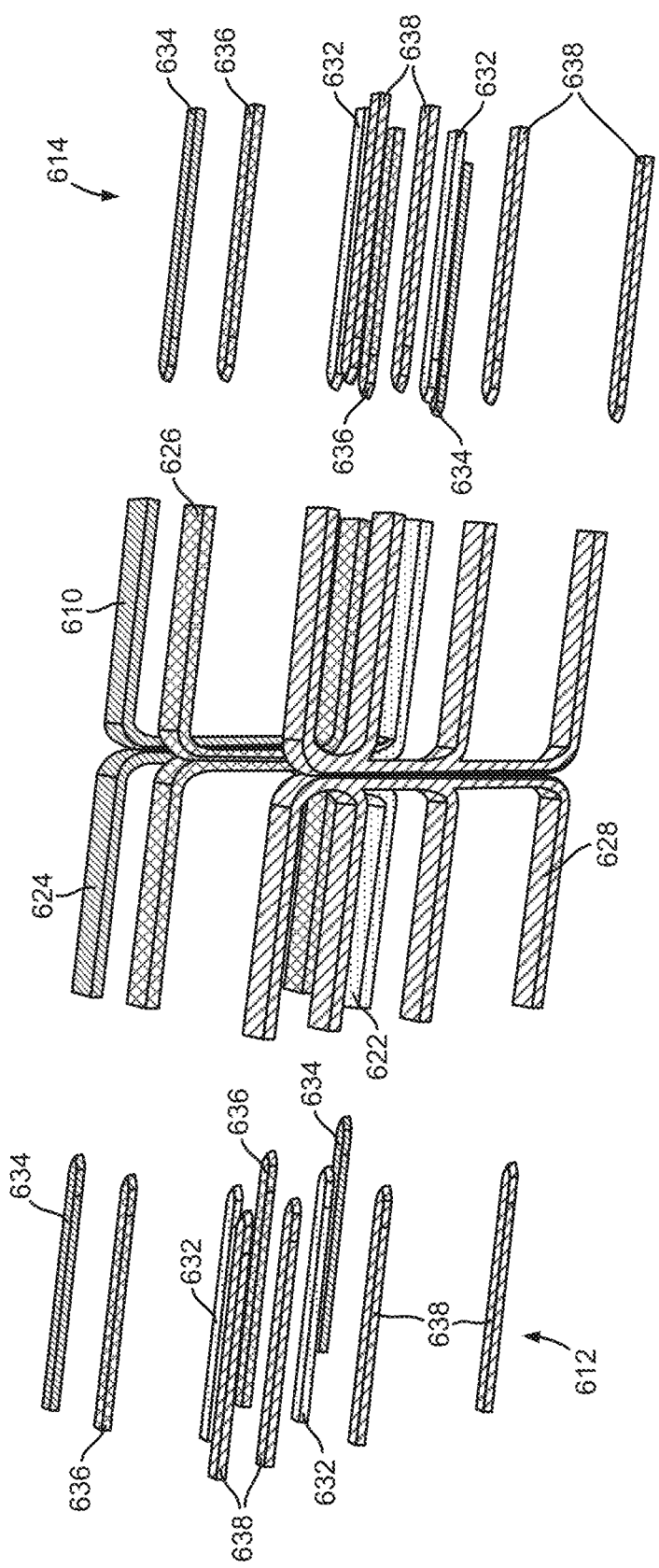

FIGS. 4A through 4D, 5A and 5B are directed to an implementation in which optical waveguides formed in structure 400 transmit optical signals between different IC devices 312-1 through 312-4 in a vertical stack configuration. FIGS. 6A and 6B are directed to a particular implementation in which a structure 604 may comprise optical waveguides capable of routing signals between or among different IC devices in a vertical stack configuration, and/or between or among IC devices on different vertical stacks. According to an embodiment, vertical stacks of IC devices 602 and 606 may comprise individually fabricated IC devices bonded together as discussed above in connection with IC devices 312.

IC devices in vertical stacks of IC devices 602 and 606 comprise channels or cavities having surfaces on which exposed optical waveguides are formed. These channels or cavities may comprise dimensions matched to features of structure 604 to enable either vertical stack of IC devices 602 and/or vertical stack of IC devices 606 to fixedly interlock with structure 604. For example, structure 604 may be configured to fixedly interlock with vertical stack of IC devices 602 or vertical stack of IC devices 606 as structure 400 may be configured to fixedly interlock with structure 300 as described above.

In an implementation, fixedly interlocking structure 604 with vertical stack of IC devices 602 may align optical waveguides formed on IC devices of vertical stack of IC devices 602 with exposed portions of optical waveguides formed in structure 604. This may, for example, permit an optical coupling of the optical waveguides formed on the IC devices of vertical stack 602 and the exposed portions of the optical waveguides formed in structure 604. As discussed above in connection with embodiments according to FIGS. 4A through 4D, 5A and 5B, optical waveguides formed in structure 604 may route optical signals between different ID devices of vertical stack 602.

Also, fixedly interlocking structure 604 with vertical stack of IC devices 606 may align optical waveguides formed on IC devices of vertical stack of IC devices 602 with exposed portions of optical waveguides formed in structure 604. This may, for example, permit an optical coupling of the optical waveguides formed on the IC devices of vertical stack 606 and the exposed portions of the optical waveguides formed in structure 604. Being optically coupled with optical waveguides formed on the IC devices of vertical stack 602 and optical waveguides formed on the IC devices of vertical stack 606, optical waveguides formed in structure 604 may route optical signals between optical waveguides formed on IC devices of vertical stack 602 and optical waveguides formed on IC devices of vertical stack 606.

As illustrated in FIG. 6B, structure 604 comprises four contiguous optical waveguides, optical waveguides 622, 624, 626 and 628. In an implementation, while structure 604 is fixedly interlocked with vertical stacks of IC devices 602 and 606, any of the optical waveguides 622, 624, 626 and 628 may route transmit optical signals between or among exposed portions of optical waveguides formed on IC devices of vertical stacks of IC devices 602 and 606. For example, contiguous optical waveguide 622 formed in structure 604 may optically couple with exposed portions of optical waveguides 632 formed on IC devices of vertical stacks of IC devices 602 and 606. Here, optical waveguide 622 may be positioned and aligned to route optical signals between or among the exposed portions of optical waveguides 632 (e.g., between or among optical waveguides 632 formed on the same vertical stack of IC devices, between or among optical waveguides 632 formed on different vertical stacks of IC devices, or a combination thereof). Likewise, contiguous optical waveguide 624 formed in structure 604 may optically couple with exposed portions of optical waveguides 634 formed on IC devices of vertical stacks of IC devices 602 and 606. Here, contiguous optical waveguide 624 may be positioned and aligned to route optical signals between or among the exposed portions of optical waveguides 634 (e.g., between or among optical waveguides 634 formed on the same vertical stack of IC devices, between or among optical waveguides 634 formed on different vertical stacks of IC devices, or a combination thereof). Also, contiguous optical waveguide 626 formed in structure 604 may optically couple with exposed portions of optical waveguides 636 formed on IC devices of vertical stacks of IC devices 602 and 606. Here, contiguous optical waveguide 626 may be positioned and aligned to route optical signals between or among the exposed portions of optical waveguides 636 (e.g., between or among optical waveguides 636 formed on the same vertical stack of IC devices, between or among optical waveguides 636 formed on different vertical stacks of IC devices, or a combination thereof). Finally, contiguous optical waveguide 628 formed in structure 604 may optically couple with exposed portions of optical waveguides 638 formed on IC devices of vertical stacks of IC devices 602 and 606. Here, contiguous optical waveguide 628 may be positioned and aligned to route optical signals between or among the exposed portions of optical waveguides 638 (e.g., between or among optical waveguides 638 formed on the same vertical stack of IC devices, between or among optical waveguides 638 formed on different vertical stacks of IC devices, or a combination thereof).

As may be observed from FIG. 4D, portions of optical waveguides formed in structure 400 may be separately identified. For example, optical waveguide 420 may comprise optically coupling portions 419 which are to be exposed for optically coupling to optical waveguides 316. Optically coupling portions 419 may then be connected by a connecting portion 421 to form a contiguous optical waveguide capable of routing optical signals between or among different optical waveguides 316 (and, hence, different IC devices 312). According to an embodiment, and as discussed below, in a process to form contiguous optical waveguides in structure 400 optically coupling portions 419 of optical waveguides formed in structure 400 may be formed separately from connecting portions 421. For example, coupling portions 419 and connecting portions 421 may be formed in different process steps of a sequence of process steps to fabricate structure 400.

Figure 6C:
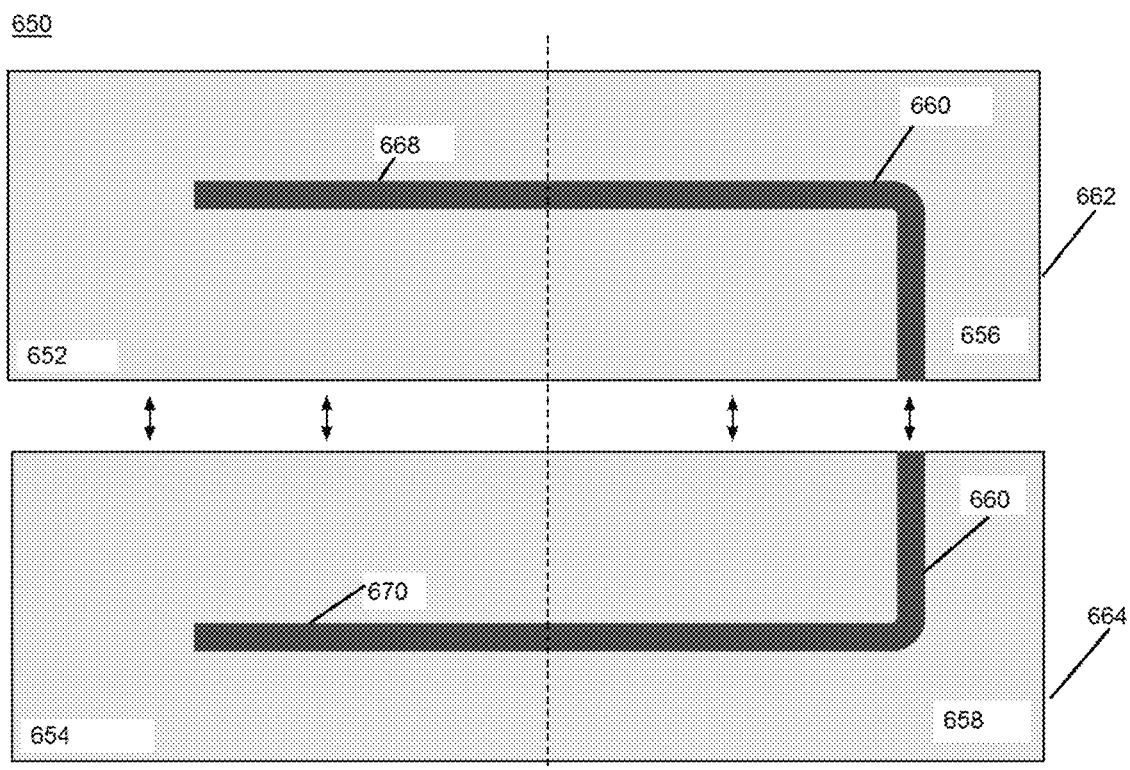
FIG. 6C is a diagram illustrating features of a first alternative implementation.

In particular embodiments discussed above in connection with FIGS. 2A through 6B, a vertical stack of IC devices (e.g., as structure 300) may be fabricated separately from a connecting device with three-dimensional waveguides (e.g., fabricated as structure 400). The vertical stack of IC devices may then be fixedly interlocked with the connecting device with three-dimensional waveguides as discussed above. In an alternative embodiment 650 as illustrated in FIG. 6C, portions of a three-dimensional waveguide may be formed with ICs prior to a vertical stacking (and bonding) of the ICs in a subsequent assembly step. Here, a first portion of a three-dimensional waveguide 660 may be formed in a structure 656 and a second portion of three-dimensional waveguide 660 may be separately formed in a structure 658. Structure 656 may then be bonded with a first IC device 652 containing an optical waveguide 668 to optically couple optical waveguide 668 with the first portion of three-dimensional waveguide 660 to form a top layer 662. Likewise, structure 658 may be bonded with a second IC device 654 containing an optical waveguide 670 to optically couple optical waveguide 670 with the second portion of three-dimensional waveguide 660 to form a bottom layer 664. Finally, top layer 662 and bottom layer 664 may be vertically bonded (e.g., using wafer bonding techniques) to integrate first and second portions of three-dimensional waveguide 660 separately formed in structures 656 and 658.

Figure 6D:
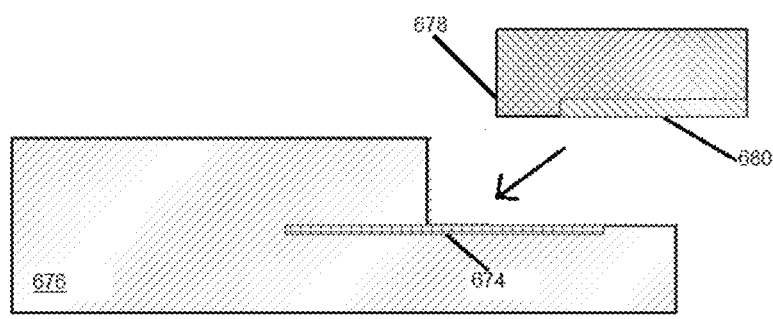
FIGS. 6D and 6E are diagrams illustrating features of a second alternative implementation.

In alternative embodiment, the implementation of structure 400 shown in FIGS. 4A through 4D, 5A and 5B may be modified to simplify manufacturability of waveguides in a connecting structure and/or alignment of waveguides in an integrated circuit with waveguides in a connecting member for optical coupling. For example, FIG. 6D shows a cross-section of an integrated circuit device 676 (e.g., such as integrated circuit device 200 discussed above) that includes one or more waveguides 674 having an exposed portion that may be optically coupled to a waveguide of a connecting device. A spot-size converter 678 may comprise one or more exposed waveguide segments 680 that may be optically coupled to the exposed portion of the one or more waveguides 674 while spot-size converter 678 is fitted to integrated circuit device 676. In an embodiment, spot-size converter 678 may be formed from any one of several substrate materials and may be bonded to integrated circuit device 676 using an adhesive, etc.

Figure 6E:
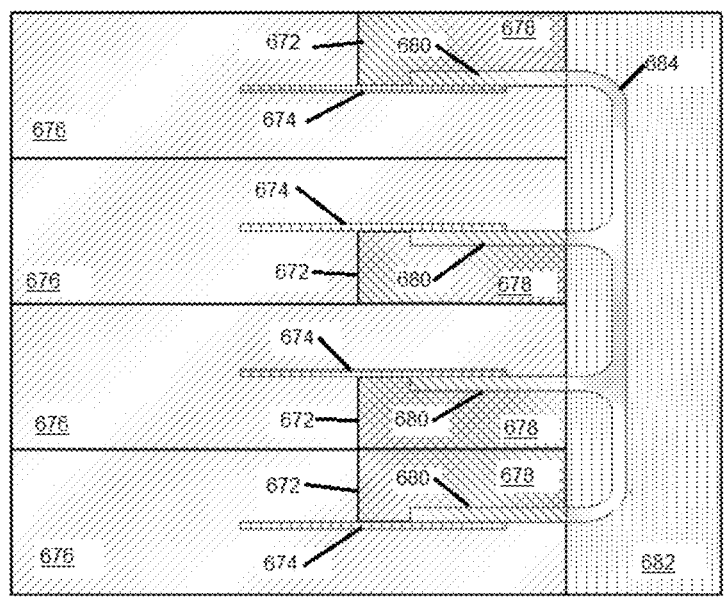

As shown in FIG. 6E, spot-size converter 678 may be bonded to multiple integrated circuit devices 676, and then the multiple integrated circuit devices 676 may be bonded together in a vertical stack. Solid structure 682 may be formed separately from integrated circuit devices 676 and spot-size converter 678. Solid structure 682 may further comprise one or more waveguides 684. In an embodiment, solid structure 682 may be bonded to vertically stacked integrated circuit devices 676 such that end portions of waveguide segments 680 abut corresponding end portions of the one or more waveguides 684. Here, waveguide segments 680 optically coupled with waveguides 674 may transmit optical signals between waveguides 674 and waveguides 684.

Figure 7A:
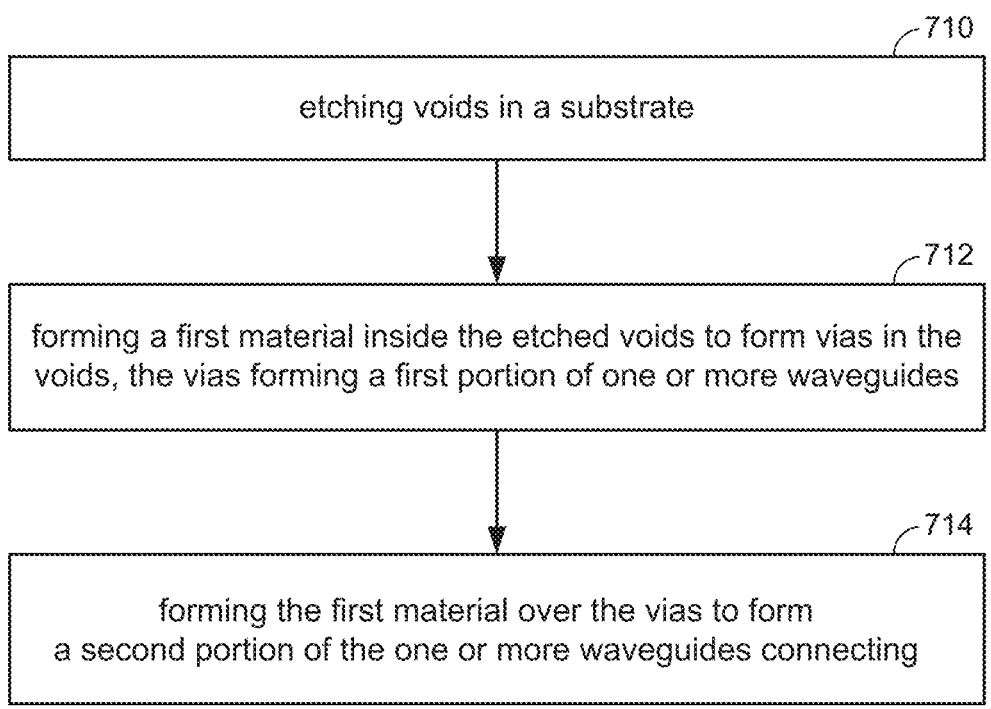
FIG. 7A is a flow diagram illustrating features of a process to manufacture a device according to an embodiment.

FIG. 7A is a flow diagram of a first process to form structure such as structure 400. In an embodiment, structure 400 may comprise optical waveguide cores formed from a suitable material, such as silicon, silicon nitride, or polymer, etc., in a suitable material for waveguide cladding, such as silica ($SiO_2$) or polymer. Use of flexible polymer for core and cladding formation may assist in alleviating an alignment and interlocking process related issues that a rigid material may likely suffer from. In an implementation, features of the process of FIG. 7A may be illustrated in FIGS. 8 through 17. In an implementation, the process of FIG. 7A may be used to form at least a first two-dimensional waveguide in a solid structure; and at least a second two-dimensional waveguide in the solid structure, wherein the first two-dimensional waveguide and the second two-dimensional waveguide collectively span three dimensions within the solid structure (e.g., as shown in FIG. 4C where waveguides 416, 418, 420 and 430 each individually comprise two-dimensional optical waveguide structures on vertical planes but collectively span three dimensions in structure 400). As pointed out above in connection with FIGS. 5A and 5B, such a solid structure formed in connection with the process of FIG. 7A may comprise first features so as to align an exposed portion of the first two-dimensional waveguide to optically couple with one or more waveguides of a first integrated circuit device and second features so as to align an exposed portion of the second two-dimensional waveguide to optically couple with one or more waveguides of a second integrated circuit device, wherein the first and second features are configured to couple the first and second integrated circuit devices in a vertical stack arrangement.

Figure 8:
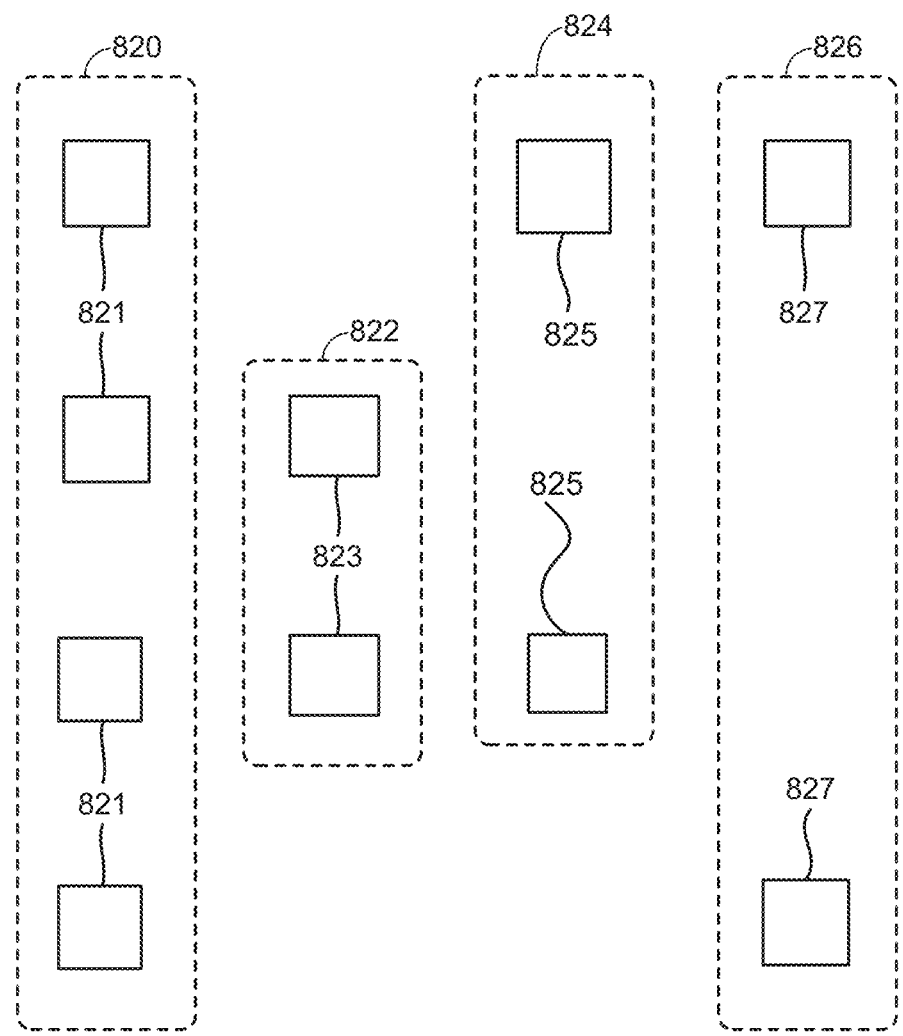
FIG. 8 is a schematic diagram of features of a mask to be applied to a substrate in a process to manufacture a device according to an embodiment.
Figure 9A:
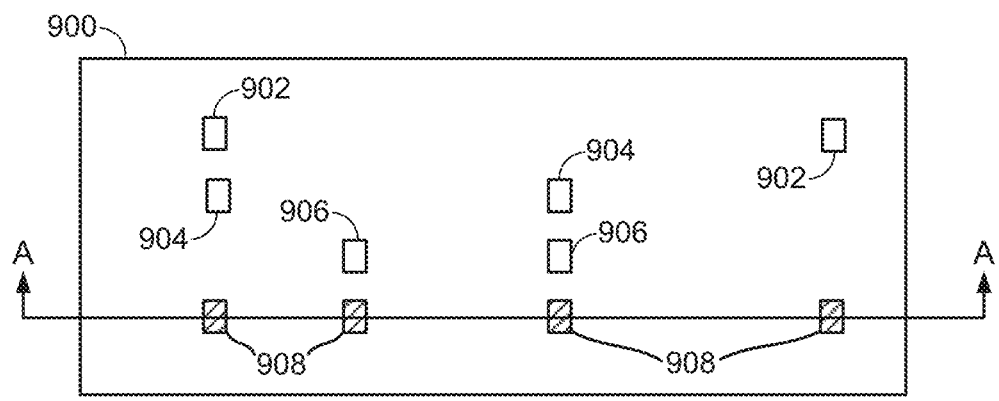
FIGS. 9A through 17 are diagrams illustrating an evolution of features of a structure according to an embodiment of a process of forming an optical connecting device.
Figure 9B:
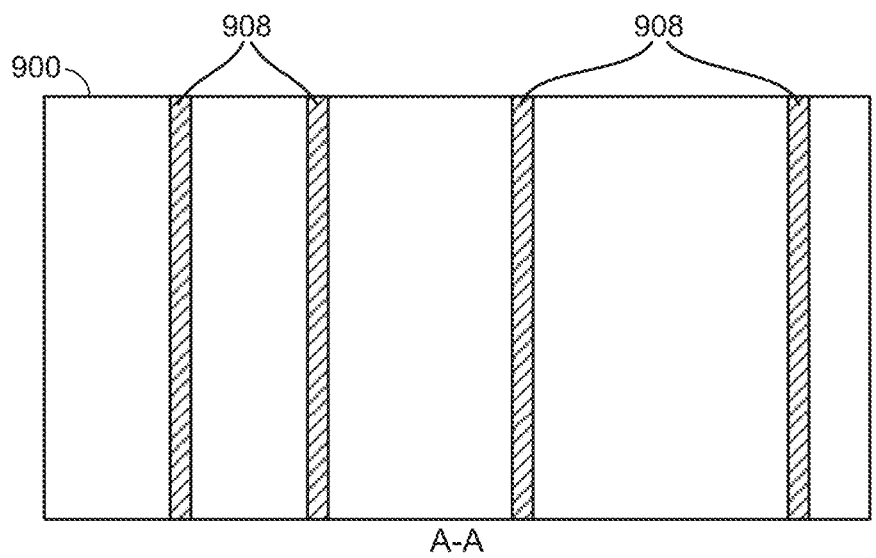

Block 710 may comprise etching voids in a solid substrate. For example, a solid substrate 900 as shown in FIGS. 9A and 9B may be etched to form voids 902, 904, 906 and 908. In particular embodiments, solid substrate 900 may comprise any suitable cladding material such as, for example, the aforementioned silicone-based polymer OE-4141 or WG-1017 available from Dow Corning Corp. Here, a mask, as shown in FIG. 8, exposing portions 821, 823, 825 and 827 may be applied to a surface of substrate 900 to enable the etching of voids. These voids may extend through substrate 900 as shown in the cross-section view of FIG. 9B. Block 712 may comprise depositing suitable polymer waveguide material (such as the aforementioned silicone-based polymer WG-1010 available from Dow Corning Corporation) inside etched voids formed in block 710 to form vias 902, 904, 906 and 908 providing first portions of optical waveguides.

Figure 10A:
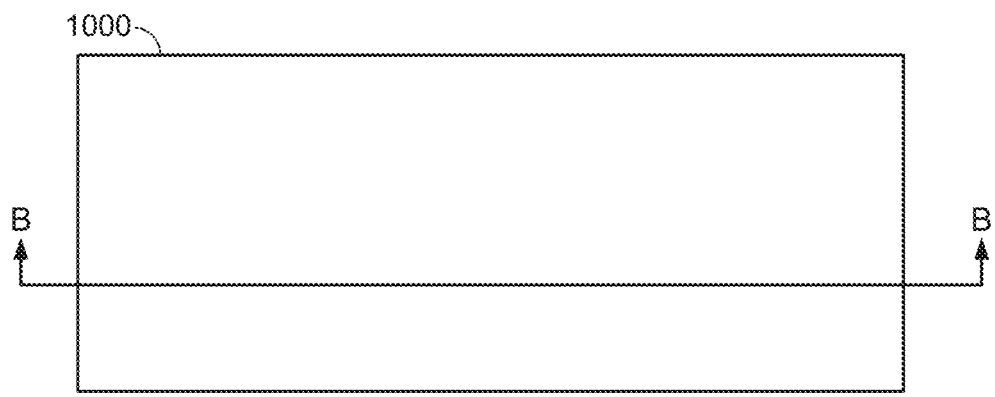
Figure 10B:
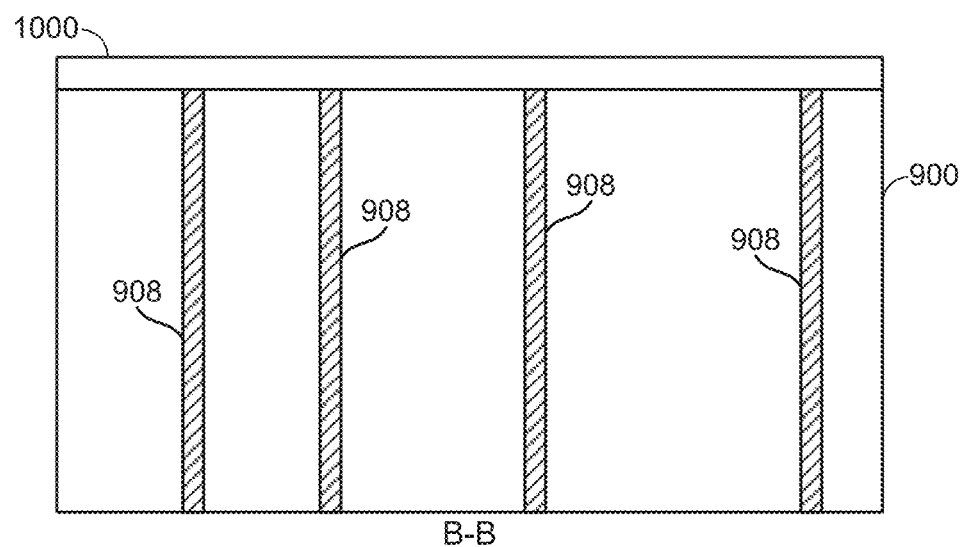
Figure 11A:
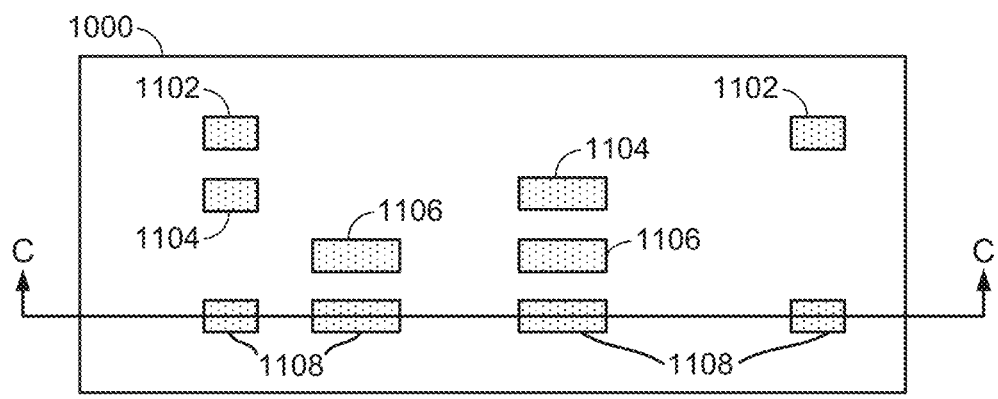
Figure 11B:
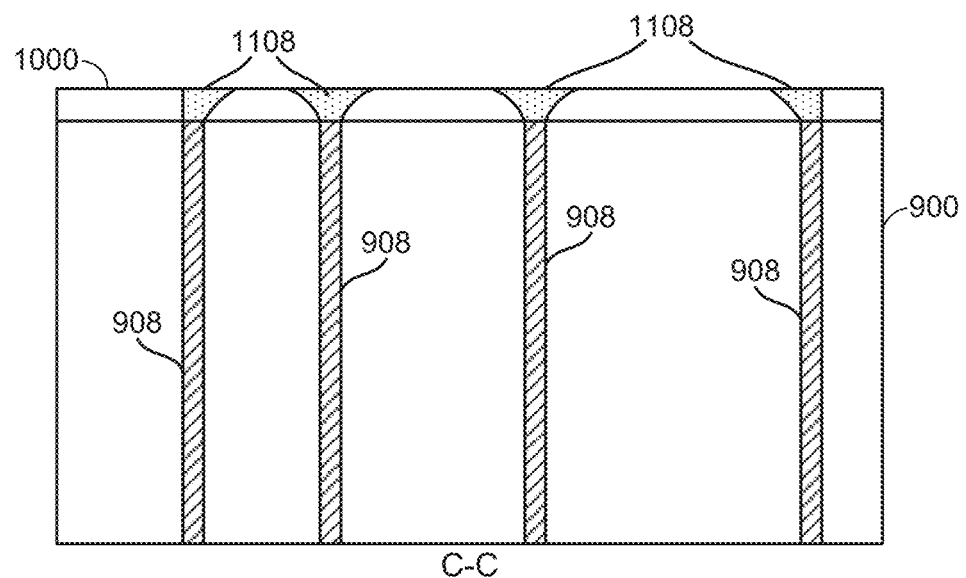
Figure 12A:
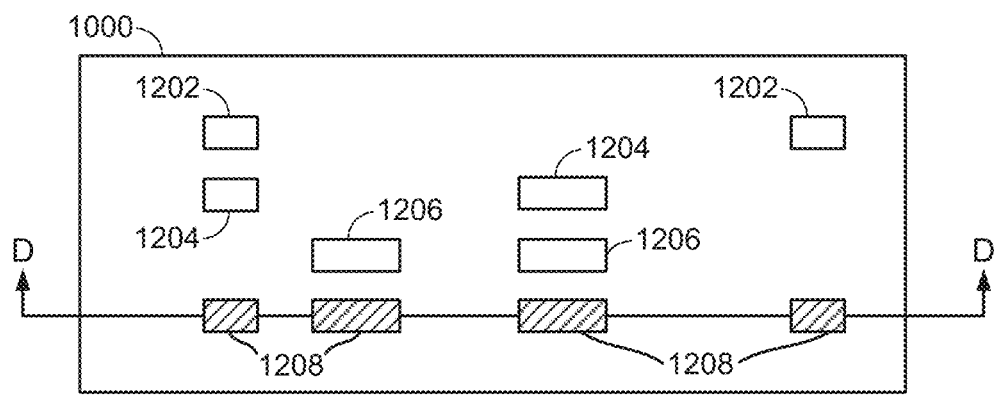
Figure 12B:
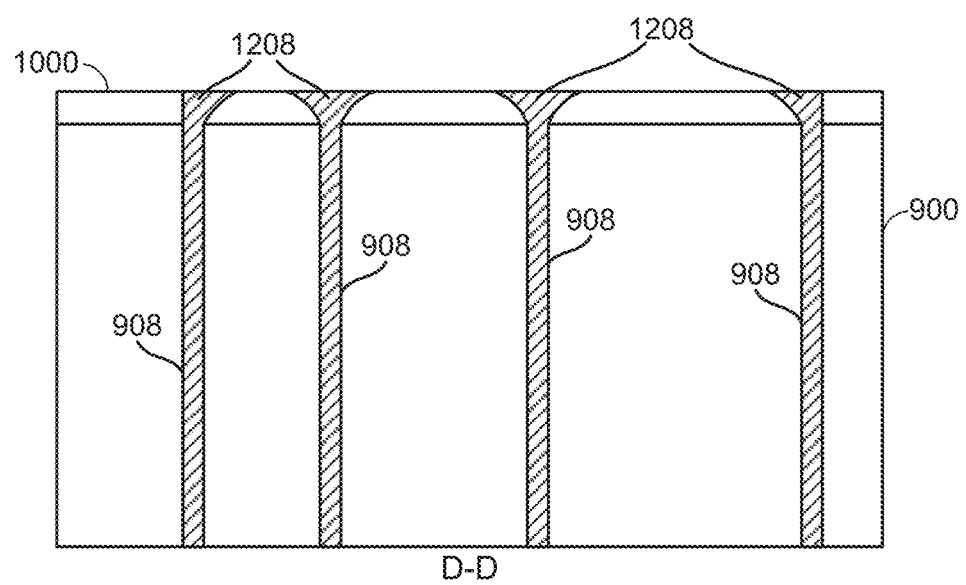

Following deposition of material inside etched voids at block 712, additional material may be deposited over the surface containing openings to the formed vias 902, 904, 906 and 908. As shown in FIGS. 10A and 10B, a layer of material 1000 (such as the polymer, silica, bulk silicon or other material used to form substrate 900) may be deposited over vias 902, 904, 906 and 908. As shown in FIGS. 11A and 11B, layer of material 1000 may be exposed to allow etching portions 1102, 1104, 1106 and 1108 over vias 902, 904, 906 and 908. The etched portions may be deposited suitable material to form filled portions 1202, 1204, 1206 and 1208 in contact and connecting with optical waveguide material deposited to form vias 902, 904, 906 and 908 as shown in FIGS. 12A and 12B.

Figure 11C:
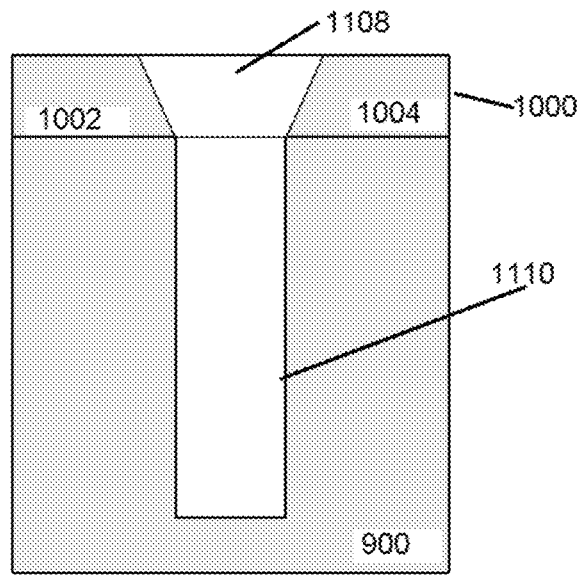
Figure 11D:
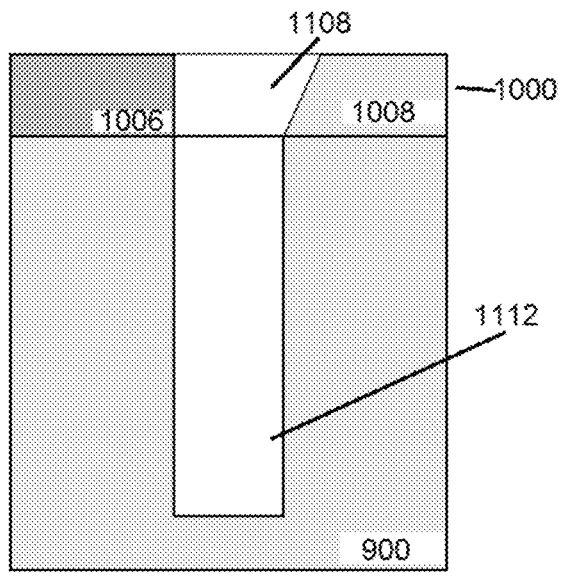
Figure 13A:
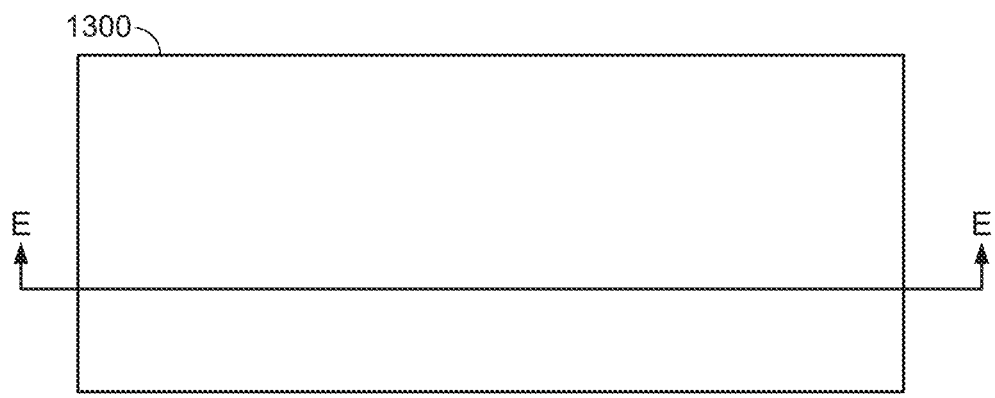
Figure 13B:
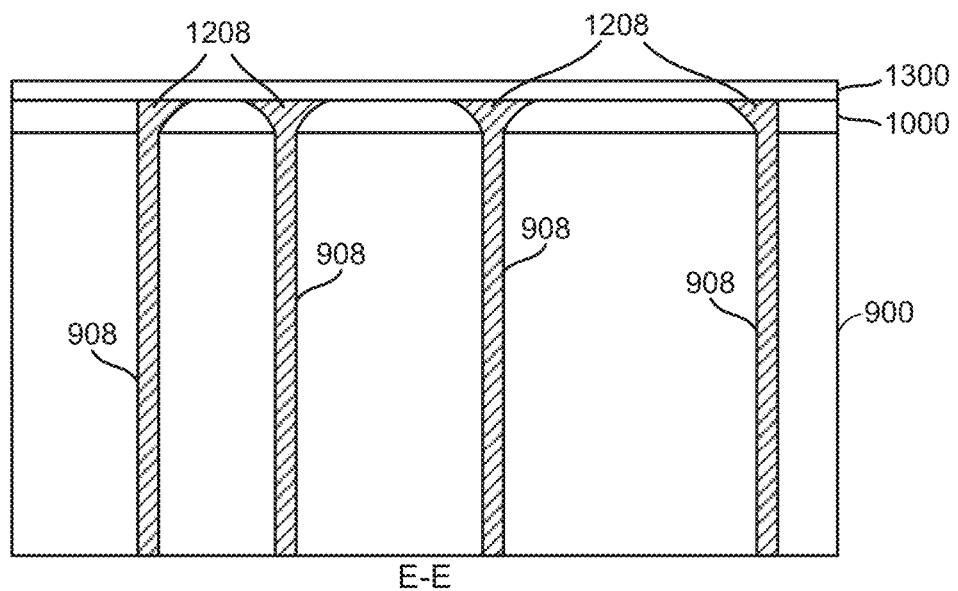
Figure 14A:
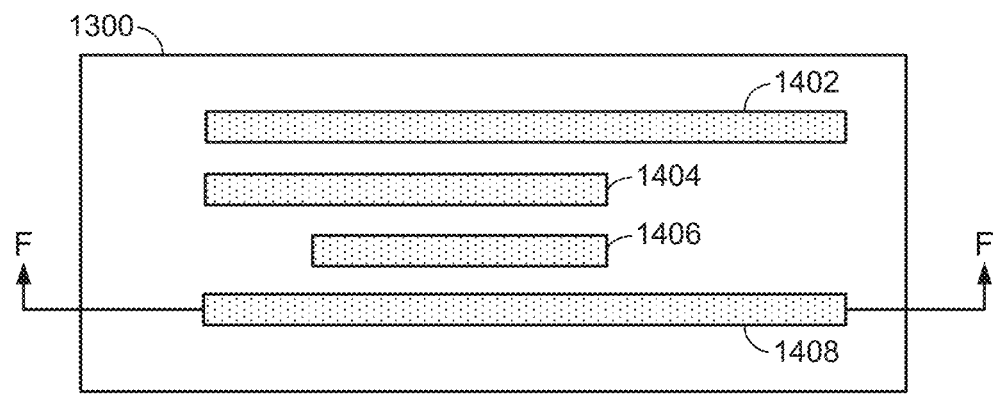
Figure 15A:
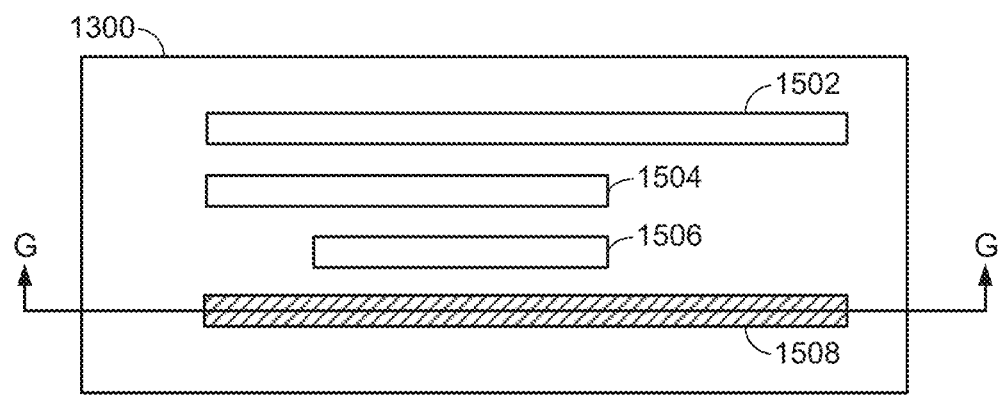
Figure 15B:
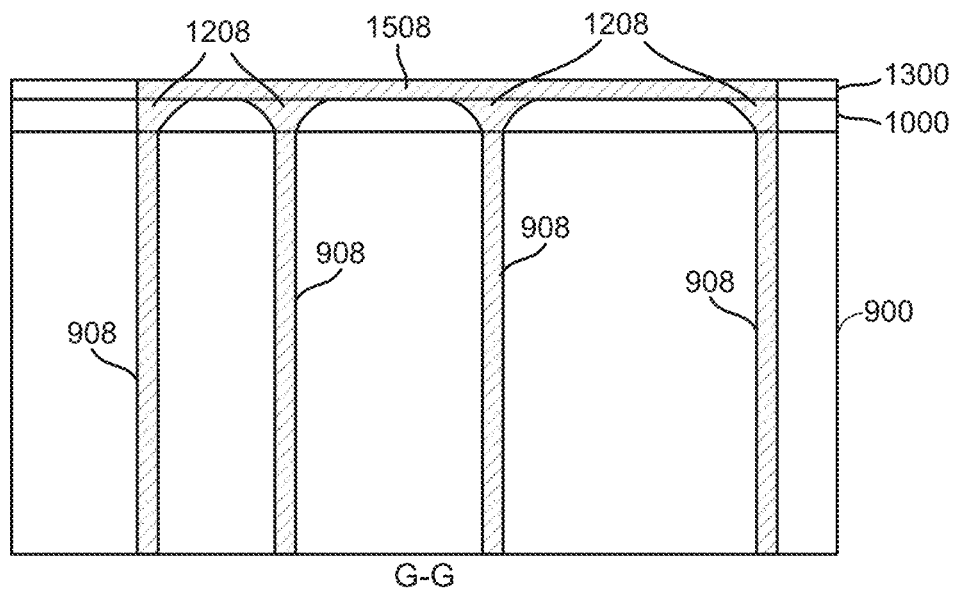

According to an embodiment, etched portions 1108 may be removed from layer of material 1000 using isotropic etching. In an implementation, voids 1110 and 1112 (to receive material to form a portion of vias 908) may be formed using an anisotropic etching technique applied to a material of substrate 900. Material filling previously etched portions 1108 may be removed using an isotropic etching technique. To form a double taper for a portion 1108 as illustrated in FIG. 11C, layer 1000 may comprise portions 1002 and 1004 formed from the same material that is responsive to the isotropic etching technique. To form a single taper for a portion 1108 as illustrated in FIG. 11D, layer 1000 may comprise portions 1006 and 1008 wherein portion 1008 may comprise a first material that is responsive to the isotropic etching technique and portion 1006 may comprise a second material that is not responsive to the isotropic etching technique. As shown in FIGS. 13A and 13B, a layer of material 1300 may be deposited over filled portions 1202, 1204, 1206 and 1208. A surface of layer 1300 may be exposed for etching to remove material for formation of connecting portions of optical waveguides. For example, a mask patterned according to 820, 822, 824, and 826 shown in FIG. 8 may be used to expose the surface of layer 1300. As illustrated in FIG. 14A, etching may then remove material in layer 1300 to form voids 1402, 1404, 1406 and 1408. As illustrated in FIG. 15A, additional material may be deposited inside voids 1402, 1404, 1406 and 1408 to form connecting portions 1502, 1504, 1506 and 1508 of optical waveguides in the solid structure. As shown by example in the cross-section view of FIG. 15B, connecting portion 1508 (in contact with filled portion 1208) connects vias 908 to form a contiguous waveguide capable of transmitting optical signals between or among vias 908 through connecting portion 1508. Accordingly, processing at block 714 may be performed by formation of filled portions 1202, 1204, 1206 and 1208 (as shown in FIGS. 12A and 12B), and/or by formation of connecting portions 1502, 1504, 1506 and 1508 (as shown in FIGS. 15A and 15B).

Figure 16:
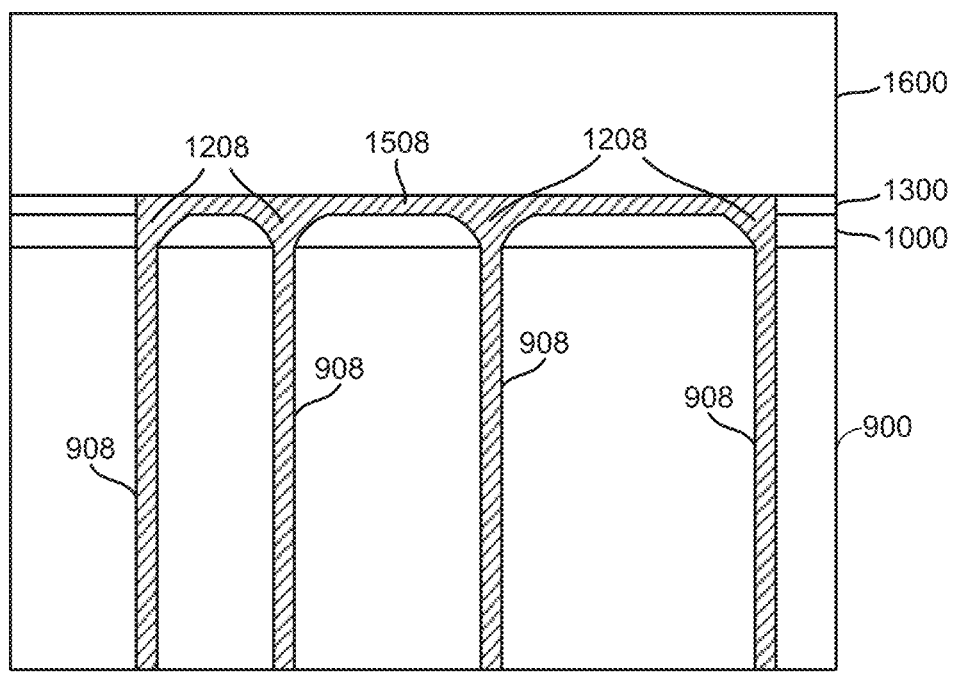
Figure 17:
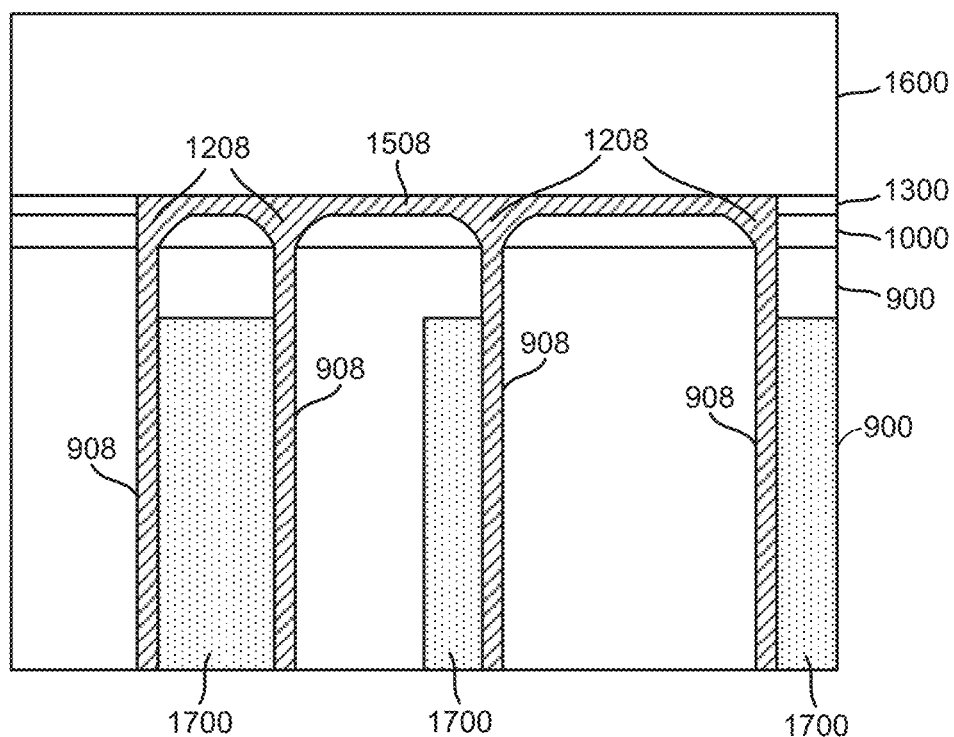

As shown in FIG. 16, one or more layers of material 1600 may be deposited over connecting portions of optical waveguides including connecting portion 1508. As shown in FIG. 17, material in substrate 900 may be removed by etching to form voids 1700 exposing portions of vias 902, 904, 906 and 908. As discussed above, exposing portions of vias 902, 904, 906 and 908 may enable an optical coupling with exposed portions of optical waveguides formed on IC devices (not shown).

Figure 7B:
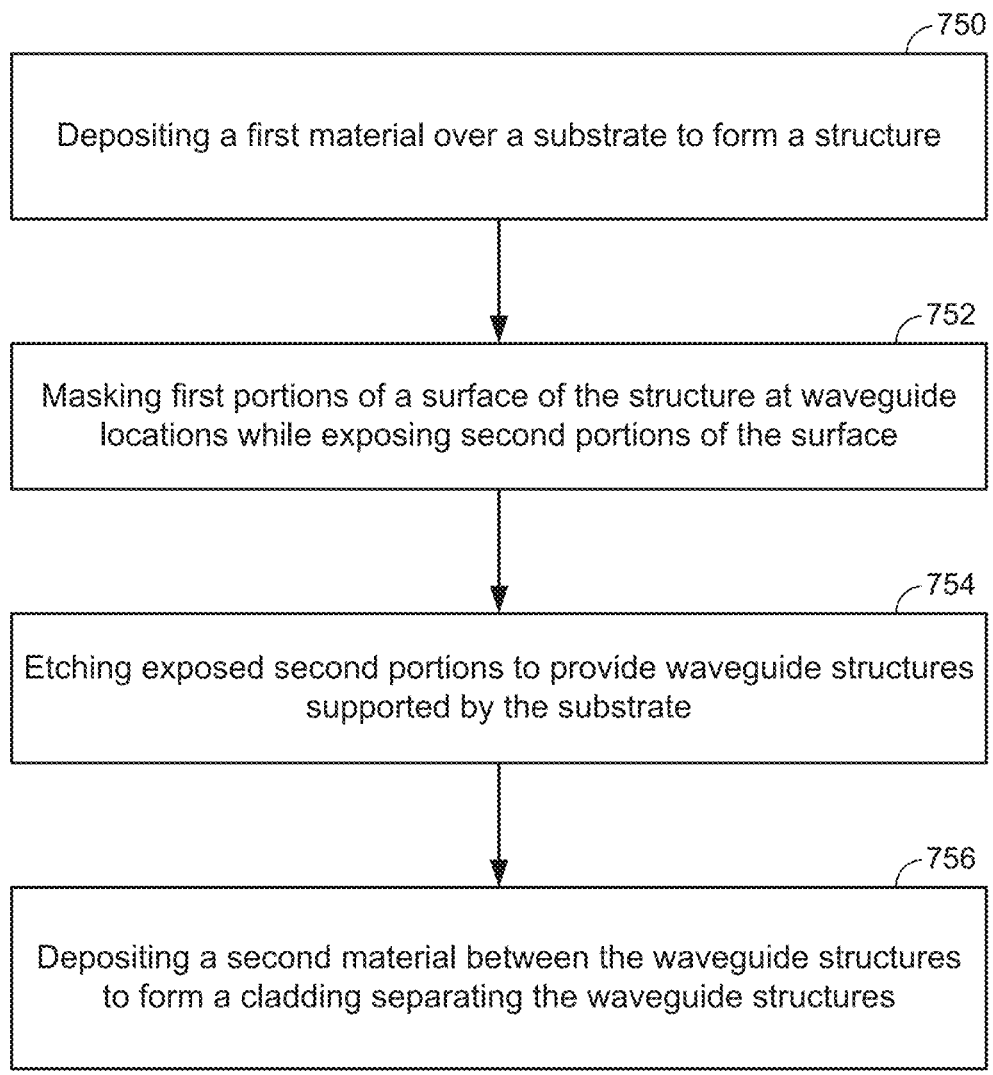
FIG. 7B is a flow diagram illustrating features of a process to manufacture a device according to an alternative embodiment.

In the particular implementation of FIG. 7A, material of substrate 900 may comprise a cladding material in which voids are created to receive a waveguide material to form vias as portions of waveguides in a structure such as structure 400. FIG. 7B is a flow diagram of an alternative process for forming a structure in which a solid waveguide material is initially formed over a substrate. At block 750, a first material, such as a waveguide material, may be deposited over a supporting substrate (not shown). Here, the first material may comprise a polymer material such as the aforementioned silicone-based polymer WG-1010 available from Dow Corning Corporation or other suitable waveguide material. Additionally, block 750 may deposit the first material using any one of several deposition techniques such as, for example, spin coating, chemical vapor deposition or physical vapor deposition, just to provide a few examples.

Block 752 may comprise masking first portions of a surface of the waveguide material deposited by block 750 at waveguide locations while exposing portions of the surface at locations between the waveguide locations. While portions 821, 823, 825 and 827 in FIG. 8 may be exposed portions for the particular process of FIG. 7A, portions masked at block 752 may comprise portions 821, 823, 825 and 827 while remaining portions are exposed or unmasked.

Block 754 may comprise etching portions of the surface of the structure formed by block 750 that are exposed following masking at block 752. Here, remaining first material (masked by portions 821, 823, 825 and 827) may comprise waveguide structures supported by the substrate on which the first material was deposited at block 750. For example, instead of forming voids 908 as shown in FIG. 9A with a remaining material of structure 900 remaining intact, block 754 may form waveguide structures supported by the substrate (e.g., in the shape of voids 908 shown in FIG. 9A) with other first material of the structure formed by block 750 being removed.

Block 756 may comprise depositing a second material between the waveguide structures formed by block 754 to form a cladding between the formed waveguide structures. Here, the second material may comprise a polymer material such as the aforementioned silicone-based polymer OE-4140 or WG-1010 available from Dow Corning Corporation or other material to form a cladding. Additionally, block 756 may deposit the second material using any one of several deposition techniques such as, for example, spin coating, chemical vapor deposition or physical vapor deposition, just to provide a few examples.

Figure 14B:
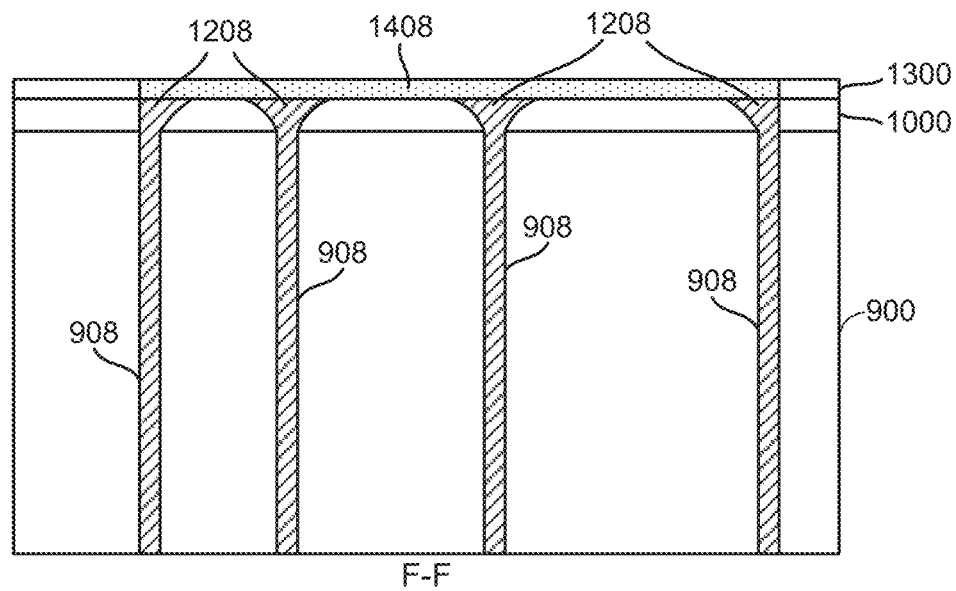

According to an embodiment, block 756 may coat top surfaces of waveguide structures formed by block 754 with a layer of the second material. Here, this layer of the second material may be removed using a chemical mechanical polish technique to expose or reveal the top surfaces of the waveguide structures formed by block 754. An additional layer of the first material may then be deposited over the polished surface in contact with the exposed or revealed top surface of the waveguide structures formed by block 754. For example, instead of forming a layer of material 1000 as shown in FIG. 10B as a cladding material, a layer of the first material may be formed. Here, instead of etching portions 1102, 1104, 1106 and 1108 as shown in FIGS. 11A and 11B, opposite portions may be removed by isotropic etching such that remaining first material in contact with the top surfaces waveguide structures (formed by block 754) may remain in the shape of filled portions 1202, 1204, 1206 and 1208 (as shown in FIGS. 12A and 12B). Voids between these structures may then be filled with deposition of the second material to provide cladding. Here, the second material may be sufficiently fluid so as to conform to the shape of voids between the structures of waveguide material. Again, this may form a layer of the second material over waveguide structures that may be removed by chemical mechanical polishing to expose or reveal top portions of the structures in the shape of filled portions 1202, 1204, 1206 and 1208. An additional layer of the first material may deposited over the exposed or revealed top portions of the structures in the shape of filled portions 1202, 1204, 1206 and 1208 to form an additional connecting portion of waveguide structures. Thereafter, regions within 1300 that do not overlap 1402, 1404, 1406, and 1408 (as shown in FIG. 14A and FIG. 14B), may be etched after a photolithographic exposure, leaving the portions 1402, 1404, 1406, and 1408 (as shown in FIG. 14A and FIG. 14B), which comprise the first material, intact. The etched portions may then be filled with deposition of the second material to provide cladding representing the regions of 1300 not overlapping 1402, 1404, 1406, and 1408 (as shown in FIG. 14A and FIG. 14B), as well as the region 1600 (as shown in FIG. 16).

Figure 18:
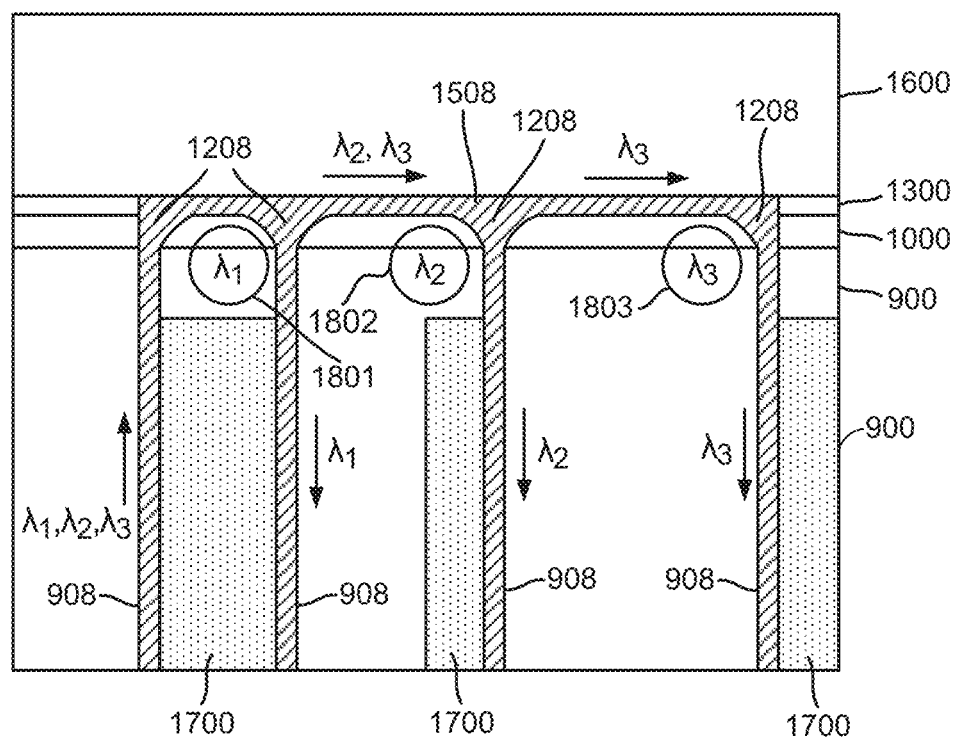
FIG. 18 is a schematic diagram of a structure including micro-ring resonator devices to control transmission of light signals in waveguides according to an embodiment.

Optionally, as shown in FIG. 18, micro-ring resonators 1801, 1802 and 1803 may be embedded in the solid structure formed as illustrated in FIGS. 9A through 17. Here, micro-ring resonators 1801, 1802 and 1803 may control the direction of optical signals to different portions of an optical waveguide. For example, micro-ring resonators 1801, 1802 and 1803 may isolate certain wavelength components of a light signal for transmission through different portions of a contiguous optical waveguide formed in solid structure as formed. In the particular example illustrated in FIG. 18, a first micro-ring resonator 1801 couples to a waveguide carrying a light signal having wavelength components $\lambda_1$, $\lambda_2$ and $\lambda_3$, and directs wavelength component $\lambda_1$ for transmission in a first portion of the optical waveguide and wavelength components $\lambda_2$ and $\lambda_3$ for transmission in a second portion of the optical waveguide. A micro-ring resonator 1802 may then receive wavelength components $\lambda_2$ and $\lambda_3$ transmitted in the second portion of the optical waveguide, and direct wavelength component $\lambda_2$ for transmission in a third portion of the optical waveguide and wavelength component $\lambda_3$ for transmission in a fourth portion of the optical waveguide.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
    forming at least a first waveguide segment in a solid structure;
    forming at least a second waveguide segment in the solid structure, the first waveguide segment and the second waveguide segment forming parallel waveguide segments; and
    forming at least a third waveguide segment to connect the first waveguide segment and the second waveguide segment,
    wherein:
    the third waveguide segment to connect the first waveguide segment and the second waveguide segment to form a waveguide structure spanning within the solid structure;
    the solid structure comprises first exterior dimensions matching dimensions of a cavity or channel formed in a first integrated circuit device, the first exterior dimensions of the solid structure match the dimensions of the cavity or channel so as to align an exposed portion of the first waveguide segment to optically couple with one or more waveguides of the first integrated circuit device;
    the solid structure further comprises second exterior dimensions so as to align an exposed portion of the second waveguide segment to optically couple with one or more waveguides of a second integrated circuit device; and the first and second exterior dimensions are configured to couple the first and second integrated circuit device in a vertical stack arrangement; and the third waveguide segment to be configured to transmit optical signals between the one or more waveguides of the first integrated circuit device and the one or more waveguides of the second integrated circuit device while in the vertical stack arrangement.

2. The method of claim 1, and further comprising:
etching voids in a substrate;
forming a first material inside the etched voids to form vias in the voids;
and
forming the first material over the vias to form the third waveguide segment in contact with the vias.

3. The method of claim 2, and further comprising, prior to forming the first material inside the etched voids to form the vias:
forming a second material over the vias to form a first layer;
exposing portions of a surface of the first layer; and
etching either the exposed or unexposed portions of the surface of the first layer to reveal the vias, wherein forming the first material over the vias to form the third waveguide segment comprises forming the first material inside the etched portions of the surface of the first layer to form the third waveguide segment.

4. The method of claim 2, and further comprising, prior to forming the first material inside the voids to form the vias:
forming a second material over the vias to form a first layer;
etching localized tapered voids over the vias; and
forming the first material inside the localized tapered voids to form tapered fillings, wherein forming the first material over a surface of the substrate to form the third waveguide segment connecting exposed portions of the vias further comprises depositing the first material at least partially on the tapered fillings.

5. The method of claim 2, and further comprising etching portions of the substrate to reveal the portions of the first and second waveguide segments sufficiently to enable optical coupling with optical waveguides formed on the first and second integrated circuit devices.

6. The method of claim 2, and further comprising forming a second material over the third waveguide segment.

7. The method of claim 1, and further comprising:
depositing a first material over a substrate to form a structure;
masking first portions of a surface of the structure at waveguide locations while exposing second portions of the surface;
etching exposed second portions to provide waveguide structures supported by the substrate, the waveguide structures to form portions of the first waveguide segment and the second waveguide segment; and
depositing a second material between the waveguide structures to form a cladding separating the waveguide structures, the second material to form a portion of the structure.

8. The method of claim 7, and further comprising:
polishing to remove a portion of the deposited second material to reveal portions of the waveguide structures;
depositing an additional layer of the first material over the revealed portions of the waveguide structures; and
etching to remove portions of the additional layer of the first material while remaining portions of the additional layer of the first material connect the waveguide structures; and
depositing an additional layer of the second material to fill voids between the remaining portions of the additional layer of the first material.

9. The method of claim 1, and further comprising:
etching voids in the solid structure;
depositing a first material in two or more first voids etched in the solid structure to form two or more first vias to provide at least a first portion of the first waveguide segment in the solid structure, and
depositing the first material in two or more second voids etched in the solid structure to form two or more second vias to provide at least a first portion of the second waveguide segment in the solid structure; and
depositing the first material over the first vias and the second vias to form second portions of the first waveguide segment and the second waveguide segment.

10. The method of claim 9, and further comprising:
further etching the solid structure to reveal a surface of the first portion of the first waveguide segment and to reveal a surface of the first portion of the second waveguide segment.

11. The method of claim 10, wherein:
the first integrated circuit device and the solid structure to be fixedly interlocked so as to align revealed first portions of the first waveguide segment and the second waveguide segment with exposed portions of two or more waveguides formed in the first integrated circuit device to optically couple the first waveguide segment and the second waveguide segment with the two or more waveguides formed in the first integrated circuit device, the two or more waveguides being formed with the first integrated circuit device.

12. The method of claim 11, wherein the solid structure further comprises a cladding formed by using a flexible polymer.

\* \* \* \* \*